US011256596B2

(12) United States Patent
Lee et al.

(10) Patent No.: US 11,256,596 B2
(45) Date of Patent: Feb. 22, 2022

(54) SYSTEMS AND TECHNIQUES FOR ADAPTIVE IDENTIFICATION AND PREDICTION OF DATA ANOMALIES, AND FORECASTING DATA TRENDS ACROSS HIGH-SCALE NETWORK INFRASTRUCTURES

(71) Applicant: Datadog, Inc., New York, NY (US)

(72) Inventors: Homin Lee, Jersey City, NJ (US); Stephen Kappel, Plainview, NY (US); Alex Ustian, New York, NY (US)

(73) Assignee: Datadog, Inc., New York, NY (US)

( * ) Notice: Subject to any disclaimer, the term of this patent is extended or adjusted under 35 U.S.C. 154(b) by 586 days.

(21) Appl. No.: 16/172,273

(22) Filed: Oct. 26, 2018

(65) Prior Publication Data

US 2019/0129821 A1 May 2, 2019

Related U.S. Application Data

(60) Provisional application No. 62/577,468, filed on Oct. 26, 2017, provisional application No. 62/592,251, filed on Nov. 29, 2017.

(51) Int. Cl.
| | |
|---|---|
| *G06F 11/34* | (2006.01) |
| *G06F 17/15* | (2006.01) |
| *G06N 7/00* | (2006.01) |
| *G06F 17/18* | (2006.01) |

(52) U.S. Cl.
CPC ...... *G06F 11/3452* (2013.01); *G06F 11/3419* (2013.01); *G06F 11/3495* (2013.01); *G06F 17/15* (2013.01); *G06F 17/18* (2013.01); *G06F 2201/81* (2013.01); *G06F 2201/875* (2013.01); *G06N 7/00* (2013.01)

(58) Field of Classification Search
CPC ............ G06F 11/3452; G06F 11/3419; G06F 11/3495; G06F 17/15; G06F 17/18; G06F 11/07; G06N 7/00
USPC ........................................................ 702/182
See application file for complete search history.

(56) References Cited

U.S. PATENT DOCUMENTS

| | | | |
|---|---|---|---|
| 9,614,742 B1* | 4/2017 | Zhang | H04L 43/0823 |
| 2016/0294640 A1* | 10/2016 | Da Silva | H04L 61/2007 |
| 2018/0136994 A1* | 5/2018 | Toledano | G06F 11/322 |
| 2018/0322400 A1* | 11/2018 | Shahand | G06F 11/3447 |

\* cited by examiner

*Primary Examiner* — Michael P Nghiem
(74) *Attorney, Agent, or Firm* — Fish & Richardson P.C.

(57) ABSTRACT

An anomaly detection platform can be used to monitor the operation performed on or by a computer system to identify potentially anomalous conditions. In response, a corrective action can be taken to address the issue. This can be useful, for example, in improving the efficiency, effectiveness, and reliability of the computer system during operation.

22 Claims, 25 Drawing Sheets

SYSTEMS AND TECHNIQUES FOR ADAPTIVE IDENTIFICATION AND PREDICTION OF DATA ANOMALIES, AND FORECASTING DATA TRENDS ACROSS HIGH-SCALE NETWORK INFRASTRUCTURES

CROSS-REFERENCE TO RELATED APPLICATIONS

This application claims priority from U.S. Provisional Application Ser. No. 62/577,468, filed on Oct. 26, 2017, and U.S. Provisional Application Ser. No. 62/592,251, filed on Nov. 29, 2017, which are incorporated herein by reference in their entirety.

TECHNICAL FIELD

The disclosure relates to monitoring computer systems to identify anomalous operation, and forecasting data trends.

BACKGROUND

Computer systems can be used to transmit, receive, and/or process data. For instance, a server computer system can be used to receive and store content (e.g., web content, such as a web page), and make the content available to one or more client computer systems. Upon receiving a request for the content from a client computer system, the server computer system can retrieve the requested content, and transmit the content to the client computer system to fulfill the request.

SUMMARY

In an aspect, a method of detecting a seasonal variation within a first time-series data sequence includes receiving, at one or more server devices, the first time-series data sequence from one or more computing devices. The first time-series data sequence indicates a performance metric associated with operations performed on the one or more computing devices over a first period of time. The first time-series data sequence includes a first temporal resolution. The method also includes deriving, by at least one processor of the one or more server devices, a plurality of second time-series data sequences from the first time-series data sequence. Each second time-series data sequence includes a respective second temporal resolution that is less than the first temporal resolution. Each second time-series data sequence indicates the performance metric over a respective second period of time less than the first period of time. The method also includes, for each second time-series data sequence, (1) removing a respective trend component of the second time-series data sequence to obtain a de-trended second time-series data sequence, and (2) autocorrelating the de-trended second time-series data sequence to obtain a plurality of autocorrelation coefficients, wherein each autocorrelation coefficient corresponds to a different respective autocorrelation time lag. The method also includes, for each set of de-trended second time-series data sequences having a common second temporal resolution, determining at least one extremum associated with the autocorrelation coefficients of the second time-series data sequences of the set, and determining one or more seasonality metrics of the first time-series data sequence based on the at least one extremum. Each seasonality metric corresponds to a respective periodic time interval for which the first time-series data exhibits recurring variation. The method also includes identifying, based on one or more seasonality metrics, at least one anomaly related to the operations being performed on the one or more computing devices over the first period of time, and responsive to identifying the at least one anomaly, generating, for the at least one anomaly, a notification that the at least one anomaly has occurred.

Implementations of this aspect can include one or more of the following features.

In some implementations, a beginning of the first period of time can correspond to a time of a first measurement of the performance metric in the first time-series data sequence. An end of the first period of time can correspond to a time of a last measurement of the performance metric in the first time-series data sequence.

In some implementations, the first temporal resolution can correspond to a frequency of measurement of the performance metric in the first time-series data sequence.

In some implementations, the performance metric can be at least one of a number of requests received by the one or more computing devices during the first period of time, an amount of computational resources consumed by the one or more computing devices during the first period of time, an amount of data written by the one or more computing devices during the first period of time, an amount of data transmitted or received by the one or more computing devices during the first period of time, an amount of time that the one or more computing devices takes to fulfill one or more requests during the first period of time, or a number of users that accessed a service provided by the one or more computing devices during the first period of time.

In some implementations, removing the respective trend component of the second time-series data sequence can include calculating a centered rolling median of the second time-series data sequence.

In some implementations, autocorrelating the de-trended second time-series data sequence can include performing an autocorrelation using Kendall's tau correlation coefficient.

In some implementations, determining at least one extremum associated with the autocorrelation coefficients of the second time-series data sequences of the set can include identifying a particular autocorrelation coefficient that is larger than each of the other autocorrelation coefficients within a radius r of the time lag of the particular autocorrelation coefficient.

In some implementations, each of the one or more seasonality metrics can correspond to a respective periodic time interval for which the first time-series data exhibits recurring variation.

In some implementations, each of the one or more seasonality metrics can correspond to all of the lag times having autocorrelation coefficients that exceed a threshold value.

In another aspect, a method of robustly detecting anomalies within a time-series data sequence includes receiving, at one or more server devices, the time-series data sequence from one or more computing devices. The time-series data sequence indicates a performance metric associated with operations performed on the one or more computing devices over a period of time. The method also includes deriving, by at least one processor of the one or more server devices, a long-term data sequence and a plurality of lookback data sequences from the time-series data sequence. The long-term data sequence includes a first temporal resolution that is less than a temporal resolution of the time-series data sequence, and each lookback data sequence includes a different corresponding second temporal resolution that is less than the first temporal resolution. The method also includes extracting, by the at least one processor, an estimated trend series from the long-term data sequence, and extracting, by the at least one processor, a lagging trend series from the long-term data sequence. The method also includes, for each lookback data sequence, removing the estimated trend series to provide a plurality of different de-trended lookback series. The method also includes compiling, by the at least one processor, a lookback matrix from the plurality of different de-trended lookback series, and deriving an estimated seasonality series from the lookback matrix, and combining the estimated seasonality series with at least a portion of the lagging trend series to provide a raw forecast series. The method also includes deriving a plurality of trend error quantiles from the estimated trend series and the lagging trend series, and deriving a plurality of seasonal error quantiles associated with the raw forecast series from the lookback matrix. The method also includes obtaining an estimate of an expected distribution of errors for a plurality of data points within the raw forecast from the plurality of trend quantiles and the plurality of seasonal error quantiles, and identifying, based on time-series data sequence, at least one anomaly related to the operations being performed on the one or more computing devices over the period of time. Each anomaly corresponds to a respective time interval during which the time-series data sequence deviated from the expected distribution of errors. The method also includes, responsive to identifying the at least one anomaly, generating, for the at least one anomaly, a notification that the at least one anomaly has occurred.

Implementations of this aspect can include one or more of the following features.

In some implementations, determining deriving the long-term data sequence can include aggregating one or more measurements of the performance metric the time-series data sequence.

In some implementations, extracting the estimated trend series from the long-term data sequence can include determining a centered rolling median over to the long-term data sequence.

In some implementations, extracting the lagging trend series from the long-term data sequence can include determining a lagging rolling median over long-term data sequence.

In some implementations, removing the estimated trend series can include subtracting the estimated trend series from each of the lookback data sequences.

In some implementations, deriving the estimated seasonality series can include determining rolling a centered triangularly-weighted median over an axis of the lookback matrix.

In some implementations, combining the estimated seasonality series with at least the portion of the lagging trend series can include adding, to each value in the estimated seasonality series, a most recent value in the lagging trend series.

In some implementations, deriving the plurality of trend error quantiles can include determining a matrix of seasonal error quantiles based on a vector of estimated seasonality values from each row in the lookback matrix.

In some implementations, obtaining the estimate of the expected distribution of errors for the plurality of data points within the raw forecast can include estimating, for each data point within the raw forecast series, an expected distribution of errors from a combination of the trend error quantiles and the seasonal error quantiles at the given point in time.

In some implementations, the performance metric can be at least one of a number of requests received by the one or more computing devices during the first period of time, an amount of computational resources consumed by the one or more computing devices during the first period of time, an amount of data written by the one or more computing devices during the first period of time, an amount of data transmitted or received by the one or more computing devices during the first period of time, an amount of time that the one or more computing devices takes to fulfill one or more requests during the first period of time, or a number of users that accessed a service provided by the one or more computing devices during the first period of time.

In another aspect, a method of robustly detecting anomalies within a time-series data sequence includes receiving, at one or more server devices, the time-series data sequence from one or more computing devices. The time-series data sequence indicates a performance metric associated with operations performed on the one or more computing devices over a period of time. The time-series data sequence includes a plurality of data items, each data item corresponding to a respective measurement of the performance metric obtained during the period of time. The method also includes determining a first seasonality metric of the time-series data sequence. The first seasonality metric corresponds to a first periodic time interval for which the time-series data exhibits recurring variation. The method also includes, for each data item of a subset of the data items of the time-series data sequence, deriving, by at least one processor of the one or more server devices, a plurality of forecast series based on a forecast function and the first seasonality metric, and deriving, based on the plurality of forecast series, an average forecast series. The method also includes deriving, based on the average forecast series, an average absolute deviation of the average forecast series from the time-series data sequence, and an error associated with a previously derived average forecast series, and deriving an forecast range with respect to the average forecast series based on the average absolute deviation and the error. The method also includes identifying at least one anomaly related to the operations being performed on the one or more computing devices over the period of time. Identifying each anomaly includes identifying a respective time interval during which the time-series data sequence deviated from the forecast range. The method also includes, responsive to identifying the at least one anomaly, generating, for the at least one anomaly, a notification that the at least one anomaly has occurred.

Implementations of this aspect can include one or more of the following features.

In some implementations, the average forecast series can be derived based on an average forecast function.

In some implementations, deriving the average absolute deviation of the average forecast series can include combining the absolute deviation and the error to create an upper bound series and a lower bound series. Deriving the forecast range can include assigning the upper bound series as an upper bound of the forecast range, and assigning the lower bound series as a lower bound of the forecasting range.

In some implementations, further method can further include determining at least one additional seasonality metric of the time-series data sequence. Each additional seasonality metric can correspond to a different respective periodic time interval for which the time-series data exhibits recurring variation. The method can also include, for each additional seasonality metric: for each data item of an additional subset of the data items of the time-series data sequence, (1) deriving a plurality of additional forecast series based on the forecast function and the additional seasonality metric, and (2) deriving, based on the plurality of additional forecast series, an additional average forecast series; deriving, based on the additional average forecast series, an additional average absolute deviation of the additional average forecast series from the time-series data sequence, and an additional error associated with a previously derived additional average forecast series; and deriving an additional forecast range with respect to the additional average forecast series based on the additional average absolute deviation and the additional error. The method can also include determining a weighted forecast series based on the average forecast series and the one or more additional average forecast series, and deriving a weighted forecast range with respect to the weighted average forecast series based on the average absolute deviation, the error, the one or more additional average absolute deviations, and the one or more additional errors. The method can also include identifying at least one anomaly related to the operations being performed on the one or more computing devices over the period of time. Identifying each anomaly can include identifying a respective time interval during which the time-series data sequence deviated from the weighted forecast range. The method can also include, responsive to identifying the at least one anomaly, generating, for the at least one anomaly, a notification that the at least one anomaly has occurred.

In some implementations, determining the weighted forecast series can include performing an online weighted majority technique.

In some implementations, deriving the weighted forecast range with respect to the weighted average forecast series can include determining a weighted average of the forecast range and the one or more additional forecast ranges.

In some implementations, the performance metric can be at least one of a number of requests received by the one or more computing devices during the first period of time, an amount of computational resources consumed by the one or more computing devices during the first period of time, an amount of data written by the one or more computing devices during the first period of time, an amount of data transmitted or received by the one or more computing devices during the first period of time, an amount of time that the one or more computing devices takes to fulfill one or more requests during the first period of time, or a number of users that accessed a service provided by the one or more computing devices during the first period of time.

In another aspect, a method of forecasting a future trend of a time-series data sequence includes receiving, at one or more server devices, the time-series data sequence from one or more computing devices. The time-series data sequence indicates a performance metric associated with operations performed on the one or more computing devices over a period of time. The time-series data sequence includes a plurality of data items, each data item corresponding to a respective measurement of the performance metric obtained during the period of time. The method also includes determining a plurality of different sub-sequences of data items of the time-series data sequence, each sub-sequence of data items spanning a different respective period of time. The method also includes determining a slope of a first trend line representing the future trend. Determining the slope of the trend line comprises determining, for each sub-sequence of data items, a respective second trend line, where each second trend line has a respective slope, determining a weighted average of at least some of the slopes of the second trend lines, and determining that the slope of the first trend line is the weighted average of at least some of the slopes of the second trend lines. The method also includes determining an upper boundary line and a lower boundary line representing the future trend. Determining the upper boundary line and the lower boundary line includes determining, for each second trend line, a respective regression error with respect to the corresponding sub-sequence of data items, and determining the upper boundary line and the lower boundary line based on the regression errors. A difference between the upper boundary line and the lower boundary line increases over time according to a square-root factor. The method also includes determining an intercept value of the first trend line. Determining the intercept value of the first trend line includes determining, for each sub-sequence of data items, a respective third first trend line, where each third trend line has a slope equal to the slope of the first trend line, and where each third trend line has a respective intercept value, determining a weighted average of at least some of the intercept values of the third trend lines, and determining that intercept value of the first trend line is the weighted average of at least some of the intercept values of the third linear regression trend lines.

Implementations of this aspect can include one or more of the following features.

In some implementations, the second trend lines can be determined concurrently.

In some implementations, determining the weighted average of at least some of the slopes of the second trend lines can include weighting a particular slope based on a fit of the slope and the corresponding sub-sequence of data items.

In some implementations, determining the weighted average of at least some of the slopes of the second trend lines can include weighting a particular slope based on an a time associated with an earliest data item in the corresponding sub-sequence of data items.

In some implementations, determining the weighted average of at least some of the slopes of the second trend lines can include weighting a particular slope based on a number of data items in the corresponding sub-sequence of data items.

In some implementations, the performance metric can be at least one of a number of requests received by the one or more computing devices during the first period of time, an amount of computational resources consumed by the one or more computing devices during the first period of time, an amount of data written by the one or more computing devices during the first period of time, an amount of data transmitted or received by the one or more computing devices during the first period of time, an amount of time that the one or more computing devices takes to fulfill one or more requests during the first period of time, or a number of users that accessed a service provided by the one or more computing devices during the first period of time.

In another aspect, a method of forecasting a trend of a time-series data sequence includes receiving, at one or more server devices, the time-series data sequence from one or more computing devices. The time-series data sequence indicates a performance metric associated with operations performed on the one or more computing devices over a period of time. The time-series data sequence includes a plurality of data items, each data item corresponding to a respective measurement of the performance metric obtained during the period of time. The method also includes determining a first seasonality metric of the time-series data sequence, the first seasonality metric corresponding to a first periodic time interval for which the time-series data exhibits recurring variation. The method also includes, for each data item of a subset of the data items of the time-series data sequence, deriving, by at least one processor of the one or more server devices, a plurality of forecast series based on a forecast function and the first seasonality metric, and deriving, based on the plurality of forecast series, an average forecast series. The method also includes determining, based on the average forecast series, a trend line representing the future trend. Determining the trend line includes sequentially determining one or more additional data items representing the future trend using the average forecast series as a predictive function. The method also includes determining a first error value, the first error value corresponding to a deviation between (i) a second average forecast series determined based on a first portion of the time-series data sequence, and (ii) a second portion of the time-series data sequence following the first portion. The method also includes determining a second error value, the second error value corresponding to a noise property of the time-series data sequence, and determining an upper boundary line and a lower boundary line representing the future trend. The upper boundary line and the lower boundary line are determined based on a weighted sum of the first error value and the second error value.

Implementations of this aspect can include one or more of the following features.

In some implementations, the upper boundary line and the lower boundary line can be determined based on a tuning parameter. The tuning parameter can be a square root factor.

In some implementations, the performance metric can be at least one of a number of requests received by the one or more computing devices during the first period of time, an amount of computational resources consumed by the one or more computing devices during the first period of time, an amount of data written by the one or more computing devices during the first period of time, an amount of data transmitted or received by the one or more computing devices during the first period of time, an amount of time that the one or more computing devices takes to fulfill one or more requests during the first period of time, or a number of users that accessed a service provided by the one or more computing devices during the first period of time.

Other implementations are directed to systems, devices and non-transitory, computer-readable mediums (e.g., for performing the methods described herein).

The implementations described herein can provide various technical benefits. For instance, the techniques described herein enable a monitoring system to monitor the performance of a computer system more efficiently and quickly. Further, the techniques herein enable a monitoring system to identifying anomalous operation in a computer system in a quicker and more efficient manner, without reduction in accuracy. As examples, using these techniques, a monitoring system can operate using less memory and fewer computational resources (e.g., lower processor utilization) than might otherwise be required with conventional techniques. This enables a monitoring system to monitor a single computer system more effectively, such that it can devote resources to other tasks. This also enables a system to monitor a greater number of computer systems concurrently than might otherwise be possible with conventional techniques.

Further, the implementations described herein enable a monitoring system to predict the future performance of computer system more efficiently and quickly, and in a more accurate manner. As examples, using these techniques, a monitoring system can forecast the future performance of a computer system using less memory and fewer computational resources than might otherwise be required with conventional techniques. This enables a monitoring system to forecast the performance of a single computer system more effectively, such that it can devote resources to other tasks. This also enables a system to forecast the performance of a greater number of computer systems concurrently than might otherwise be possible with conventional techniques. Further, using these techniques, a monitoring system can make forecasts that account for seasonable variations and/or intermittent level changes in particular performance metrics. Thus, the monitoring system can forecast the future performance of a computer system with a greater degree of accuracy.

The details of one or more embodiments are set forth in the accompanying drawings and the description below. Other features and advantages will be apparent from the description and drawings, and from the claims.

DETAILED DESCRIPTION

The operations performed on or by a computer system can be monitored to identify potentially anomalous conditions. This can be useful, for example, in improving the efficiency, effectiveness, and reliability of the computer system during operation. For example, the operations performed on or by the computer system can be monitored to identify periods of time in which the computer system is experiencing a higher than expected load, consuming an unexpected amount of computational resources, and/or behaving in an unexpected manner. In response, a corrective action can be taken to address the issue. As an example, a notification can be transmitted to one or more users (e.g., one or more administrators of the computer system) to alert them of a possible problem. As another example, additional computer systems can be activated to alleviate the load on the computer system. As another example, the computer system can be analyzed to identify and fix one or more malfunctioning components or modules.

Figure 1:
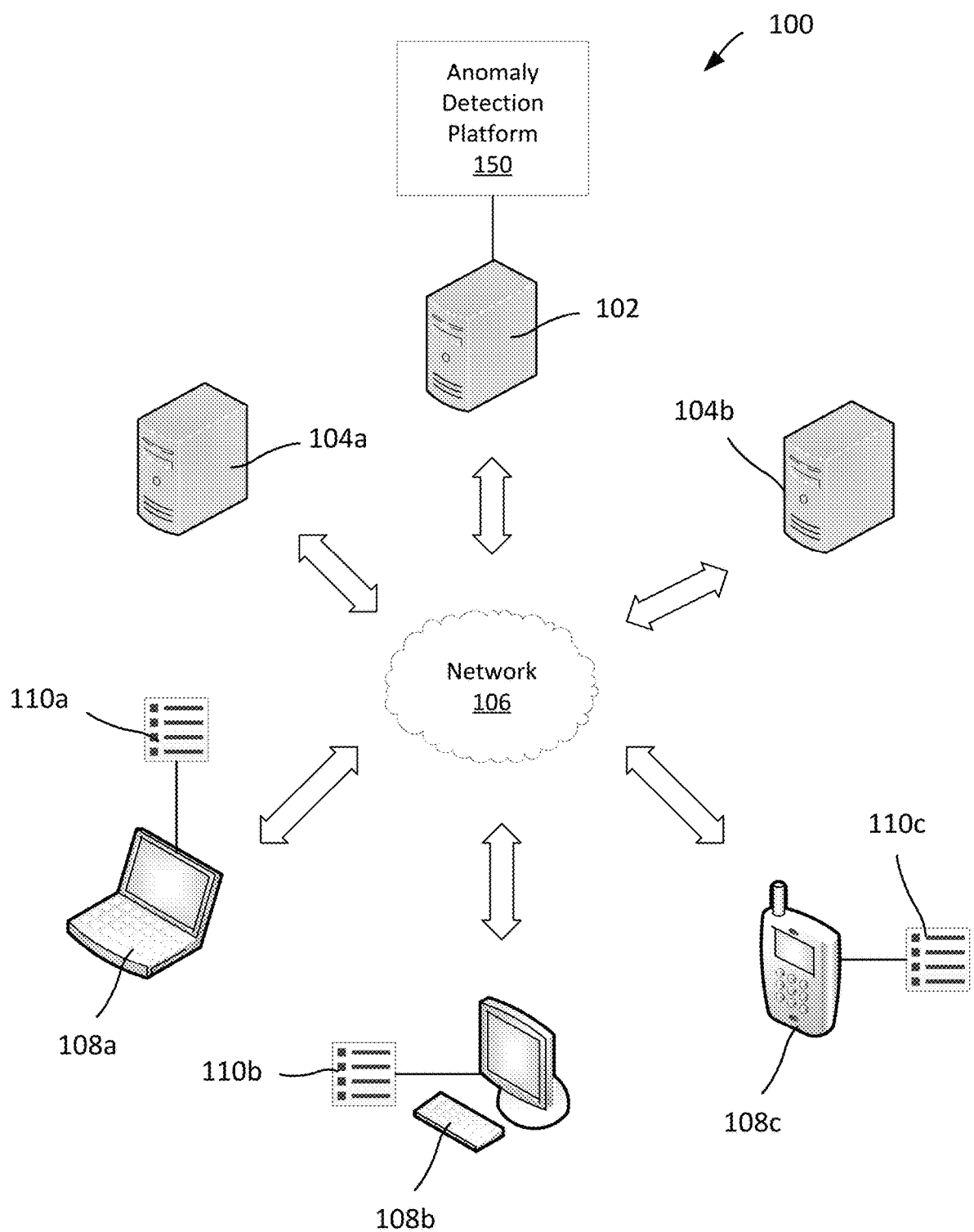
FIG. 1 is a diagram of an example system for monitoring the performance of one or more computer systems.

An example system 100 for monitoring the performance of computer systems 104a and 104b is shown in FIG. 1. The system 100 includes an anomaly detection platform 150 maintained on a server system 102 that includes one or more server computers. In some cases, the system 100 can be used to adaptively identify and predict anomalies across high-scale network infrastructures.

The server system 102 is communicatively connected to the computer systems 104a and 104b through a network 106. The computer systems 104a and 104b each can include one or more server computers. The computer systems 104a and 104b can be configured to transmit, receive, and/or process data. For instance, in some cases, the computer systems 104a and 104b can be web servers configured to receive and store content (e.g., web content, such as a web page), and make the content available to one or more other computer systems (e.g., client computer systems 108a-c). Upon receiving a request (e.g., from one of the client computer systems 108a-c), the computer systems 104a and 104b can retrieve the requested content, and transmit the content to the requesting computer system to fulfill the request. In some cases, the computer systems 104a and 104b can be owned, operated, and/or maintained by parties different from those that own, operate, and/or maintain the server system 102.

The server system 102 is also communicatively connected to the client computer systems 108a-c through the network 106. Each client computer system 108a-c includes a respective user interface 110a-c. Users can interact with the user interfaces 110a-c to view data (e.g., data on the server systems 102 and the platform 150, data on the computer systems 104a and 104b, and/or data on other the client computer systems 108a-c). Users can also interact with the user interfaces 110a-c to transmit data to other devices (e.g., to the server system 102 and the platform 150, to the computer systems 104a and 104b, and/or to the other client computer systems 108a-c). Users can interact with the user interfaces 110a-c to issue commands (e.g., to the server system 102, to the computer systems 104a and 104b, and/or to the other client computer systems 108a-c). In some implementations, a user can install a software application onto a client computer system 108a-c in order to facilitate performance of these tasks.

A client computer system 108a-c can be any electronic device that is used by a user to view, process, transmit and receive data. Examples of the client computer systems 108a-c include computers (such as desktop computers, notebook computers, server systems, etc.), mobile computing devices (such as cellular phones, smartphones, tablets, personal data assistants, notebook computers with networking capability), and other computing devices capable of transmitting and receiving data from the network 106. The client computer systems 108a-c can include devices that operate using one or more operating system (e.g., Microsoft Windows, Apple OSX, Linux, Unix, Android, Apple iOS, etc.) and/or architectures (e.g., x86, PowerPC, ARM, etc.) In some implementations, one or more of the client computer systems 108a-c need not be located locally with respect to the rest of the system 100, and one or more of the client computer systems 108a-c can be located in one or more remote physical locations.

The network 106 can be any communications network through which data can be transferred and shared. For example, the network 106 can be a local area network (LAN) or a wide-area network (WAN), such as the Internet. The network 106 can be implemented using various networking interfaces, for instance wireless networking interfaces (such as Wi-Fi, Bluetooth, or infrared) or wired networking interfaces (such as Ethernet or serial connection). The network 106 also can include combinations of more than one network, and can be implemented using one or more networking interfaces.

The server system 102 and the computer systems 104a, and 104b are each illustrated as a respective single component. However, in practice, each can be implemented on one or more computing devices. A server system 102 or a computer system 104a or 104b can be, for instance, a single computing device that is connected to the network 106. In some implementations, a server system 102 or a computer system 104a or 104b can include multiple computing devices that are connected to the network 106. For instance, the server system 102 can include several computing devices, and the platform 150 can be distributive on one or more of these computing devices. In some implementations, a server system 102 or a computer system 104a or 104b can be need not be located locally to the rest of the system 100, and portions of a server system 102 or a computer system 104a or 104b can be can be located in one or more remote physical locations.

Figure 2:
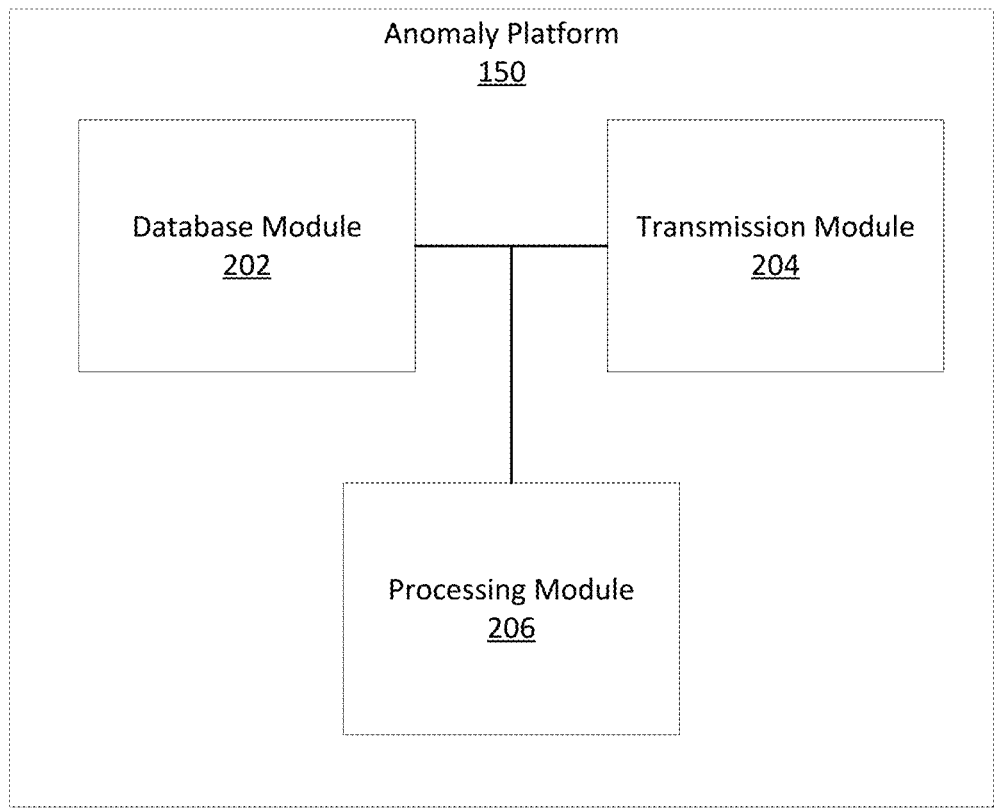
FIG. 2 is a diagram of an example anomaly detection platform.

FIG. 2 shows various aspects of the platform 150. The platform 150 includes several modules that perform particular functions related to the operation of the system 100. For example, the platform 150 can include a database module 202, a transmission module 204, and a processing module 206.

The database module 202 stores information related to one or more users of the system 100. As example, the database module 202 can store information regarding a user's identity credentials (e.g., user name and password), contact information (e.g., e-mail address, physical address, phone number, and so forth), preferences (e.g., system preferences).

Further, the database module 202 stores performance metrics associated with operations performed on or by the computer systems 104a and 104b. For example, metrics can include a number of incoming requests to a particular computer system 104a or 104b over a period of time (e.g., requests to retrieve data, requests to process data, etc.). As another example, metrics can include an amount of computational resources being consumed by a particular computer system 104a or 104b over a period of time (e.g., a percentage of the computer system's processors' that is being utilized, an amount of data that is being written to the computer systems' data storage devices, an amount of data that is being transmitted or received using the computer systems' network connection, etc.). As another example, metrics can include an amount of time that a particular computer system 104a or 104b takes to fulfill one or more requests (e.g., latency). As another example, metrics can include a number of users that are accessing a service provided by the computer system 104a or 104b over a period of time.

In some cases, metrics may be related to one or more particular functions of the computer systems 104a and 104b. As an example, in some cases, the computer system 104a or 104b can configured to present a travel website to one or more users. Users can interact with the travel website, for example, to search for travel options (e.g., search for available tickets for travel), make reservations for travel (e.g., purchase tickets), and review content (e.g., photos, audio, videos, etc.). Example metrics can include a number of searches performed by users, a number of reservations created, a number of photos review, and so forth.

As another example, in some cases, the computer system 104a or 104b can configured to monitor the operation of a manufacturing plant. Example metrics can include a number of items produced by the manufacturing plant, a number of produced items passing a quality assurance assessment, and so forth.

As another example, in some cases, the computer system 104a or 104b can configured to process financial transactions (e.g., financial payments between users). Example metrics can include a number of transactions performed using a particular type of payment method (e.g., credit card, debit card, etc.), a number of transactions performed using a particular transaction network (e.g., Visa, MasterCard, etc.), a number of declined transactions, and so forth).

Although example metrics are described herein, these are merely illustrative examples. In practice, other metrics also can be used, either in addition to or instead of those described herein.

In some cases, the performance metrics can be represented in the form of time-series data. For example, the data can include a sequence of data items, each indicating a measured value of a particular performance metric at a particular point in time. Further, each data item can include a corresponding time stamp indicating the time at which the measured value was obtained. In some cases, the data can include a series of measurements obtained periodically over a period of time (e.g., once a second, once a minute, once an hour, or any other frequency). In some cases, the performance metric can include a series of measurements obtained continuously, intermittently, or according to some other pattern.

In some cases, the performance metrics can be measured by the computer system 104a and 104b (e.g., using one or more computer agents deployed on the computer systems 104a and 104b) and transmitted to the platform 150 for storage in the database module 202. For example, the computer systems 104a and 104b can measure one or more performance metrics over a period of time (e.g., continuously, periodically, intermittently, or according to some other pattern), and transmit the measurements to the platform 150 for storage in the database module 202.

Although different examples of information are described above, these are merely illustrative. In practice, the database module 202 can store any information related to the users of the platform 150, any information related to the computer systems 104a and 104b, or any other information pertaining to the platform 150.

The transmission module 204 allows for the transmission of data to and from the platform 150. For example, the transmission module 204 can be communicatively connected to the network 106, such that it can transmit data to the computer systems 104a and 104b and/or the client computer systems 108a-c, and receive data from the computer systems 104 and 104b and/or the client computer systems 108a-c via the network 106. As an example, information inputted by users on the client computer systems 108a-c can be transmitted to the platform 150 through the transmission module 204. This information can then be processed (e.g., using the processing module 206) and/or stored (e.g., using the database module 202). As another example, information from the computer systems 104a and 104b (e.g., data indicating the performance metrics of the computer systems 104a and 104b) can be transmitted to the platform 150 through the transmission module 204. This information can then be processed (e.g., using the processing module 206) and/or stored (e.g., using the database module 202). As another example, information from the platform 150 (e.g., information stored on the database module 202) can be transmitted to one or more of the computer systems 104a and 104b and/or the client computer systems 108a-c through transmission module 204.

The processing module 206 processes data stored or otherwise accessible to the platform 150. For instance, the processing module 206 can execute automated or user-initiated processes that interrogate data for anomalies. As an example, the processing module 206 can interrogate data stored on the database module 202, or data that is received from the transmission module 204. Likewise, processed data from the processing module 206 can be stored on the database module 202 and/or sent to the transmission module 204 for transmission to other devices. In some cases, the processing module 206 can identify potentially anomalous conditions in connection with the operation of the computer systems 104a and 104b. Example processes that can be performed by the processing module 206 are described in greater detail below.

One of more implementations of the anomaly detection platform 150 can be used to monitor the performance of a computer system over a period of time, and identify potentially anomalous conditions during the operation of the computer system. The detection of the anomalous conditions may be agnostic to the type of data being interrogated and/or to the operation from which the data was derived. For instance, anomalies in a dataset may be detected by platform 150 without advance notice of or information related to whether the data in the dataset pertains to metrics regarding requests sent to or received by computer systems 104a, 104b, operations performed by or on the computer systems 104a, 104b, or data storage on computer systems 104a, 104, among other types of metrics. In some cases, anomalies can be identified by determining a forecast value (or range of forecast values) of a particular performance metric at a given time. If the measured value of the performance metric at that time deviates from the forecast value (or range of forecast values), the platform 150 determines that an anomaly has occurred. Further, in response, the platform 150 can perform a corrective action (e.g., generate a notification to a user alerting him of the anomaly, initiate an automated process to address the anomaly, etc.).

Figure 3A:
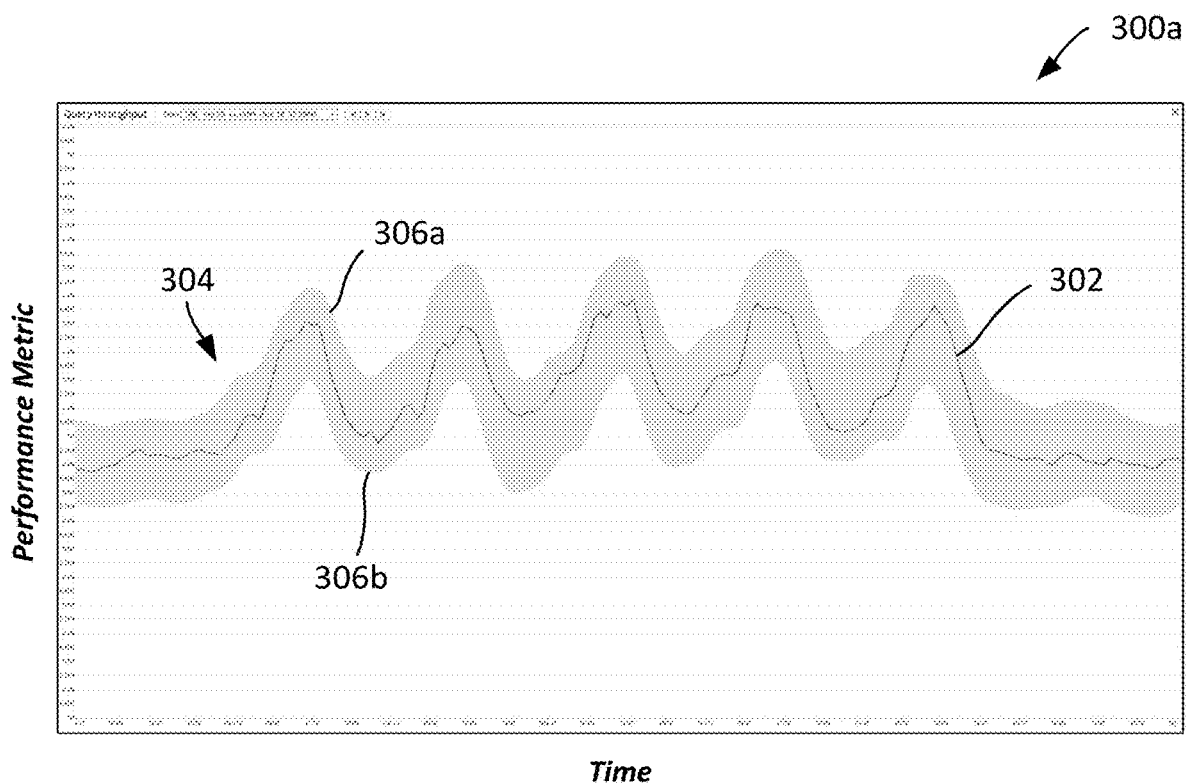
FIGS. 3A-3C are plots of example time-series data sequences.

As an example, FIG. 3A shows a plot 300a of a time-series data sequence 302 indicating a performance metric of a computer system (e.g., one of the computer systems 104a and 104b) over a period of time. The data sequence 302 can be a collection of time-series data items, and can be represented as a plot that varies over time. For instance, as shown in FIG. 3A, the x-axis can indicate a time at which a particular performance metric measurement was made, and the y-axis can indicate the value of the measured performance metric at that that time. In some cases, time-series data sequence 302 can be generated by the computer system (e.g., using one or more computer agents deployed on the computer system), and transmitted to the platform 150.

Further, the platform 150 can determine a forecast range 304 of the performance metric over a period of time. The values of the forecast range 304 also can vary over time. For example, as shown in FIG. 3A, the forecast range 304 can include a time varying upper bound 306a, and a time varying lower bound 306b.

The forecast range 304 can be determined based on historical information regarding the computer system. For example, the platform 150 can obtain measurements of the performance metric of the computer system for a period of time in the past. Based on this information, the platform 150 can identify one or more patterns and/or trends of the performance metric that occurred during in the past, and use these patterns and/or trends to predict the forecast range 302 for some time in the future. This forecast range 204 can correspond, for example, to a "normal" or non-anomalous operation of the computer system.

If the time-series data sequence 302 remains within the forecast range 304 over a period of time, the platform 150 determines that no anomalies have occurred during that period of time. However, if the time-series data sequence 302 deviates from the forecast range 304, the platform 150 determines that an anomaly has occurred, and identifies the time (or time span) during which the anomaly occurred.

For instance, in the plot 300a shown in FIG. 3A, the time-series data sequence 302 remains within the forecast range 304 over the period of time depicted in the plot 300a. Accordingly, the platform 150 determines that no anomalies have occurred during that period of time. However, in the plot 300b shown in FIG. 3B, the time-series data sequence 302 deviates from the forecast range 304 at a time 308a, and continues to deviate from the forecast range 304 until a time 308b. Accordingly, the platform 150 determines that an anomaly has occurred during the span of time from the time 308a to the time 308b.

Figure 3B:
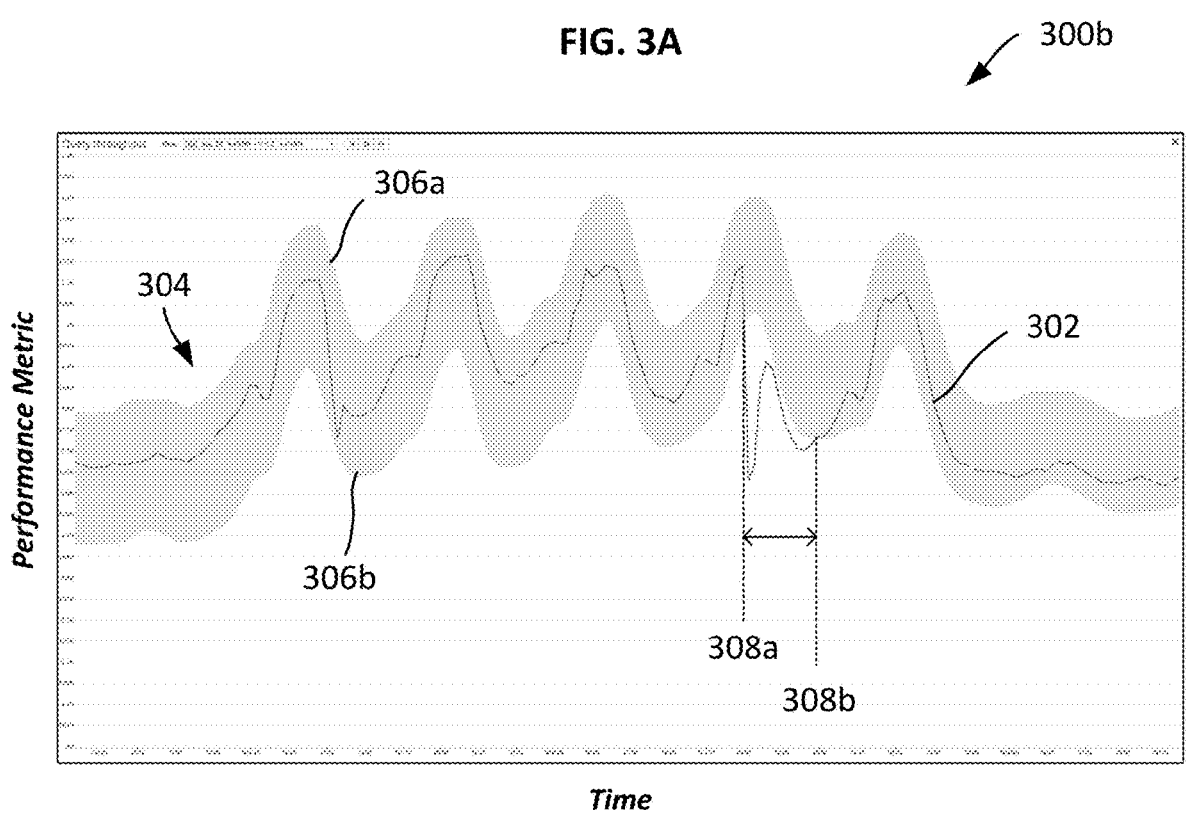

The forecast range 304 can be determined such that it accounts for a "seasonality" of the performance metric. The seasonality can refer, for example, to a recurring or periodic pattern of variation that the performance metric is expected to exhibit over time. For example, as shown in FIGS. 3A and 3B, the forecast range 304 rises and falls according to a recurring or periodic pattern. However, as long as the time-series data sequence 302 remains within this forecast range 304 (e.g., as shown in FIG. 3A), the platform 150 determines that no anomalies have occurred.

In practice, the seasonality of a performance metric can vary, depending on the implementation. As an example, a computer system may experience a relatively higher load during the day (e.g., when users are generally awake and are using the computer system more often), and experience a relatively lower load during the night (e.g., when users are generally asleep and are not using the computer system as often as during the day). Thus, the load of the computer system may be expected to have a day-to-day seasonality (e.g., having a pattern that repeats every day). Accordingly, the platform 150 can determine a forecast range 304 that accounts for this seasonality, such that it is less likely to identify anomalies erroneously due to this intraday variation. As another example, a computer system may experience a relatively higher load during weekdays (e.g., when users are generally at work), and experience a relatively lower load during weekends (e.g., when users are generally not at work). Thus, the load of the computer system may be expected to have a week-to-week seasonality (e.g., having a pattern that repeats every week). Accordingly, the platform 150 can determine a forecast range 204 that accounts for this seasonality, such that it is less likely to identify anomalies erroneously due to this intraweek variation. Although example seasonality is described herein, these are merely illustrative examples. In practice, a performance metric can exhibit other forms of seasonality, depending on the implementation.

Figure 3C:
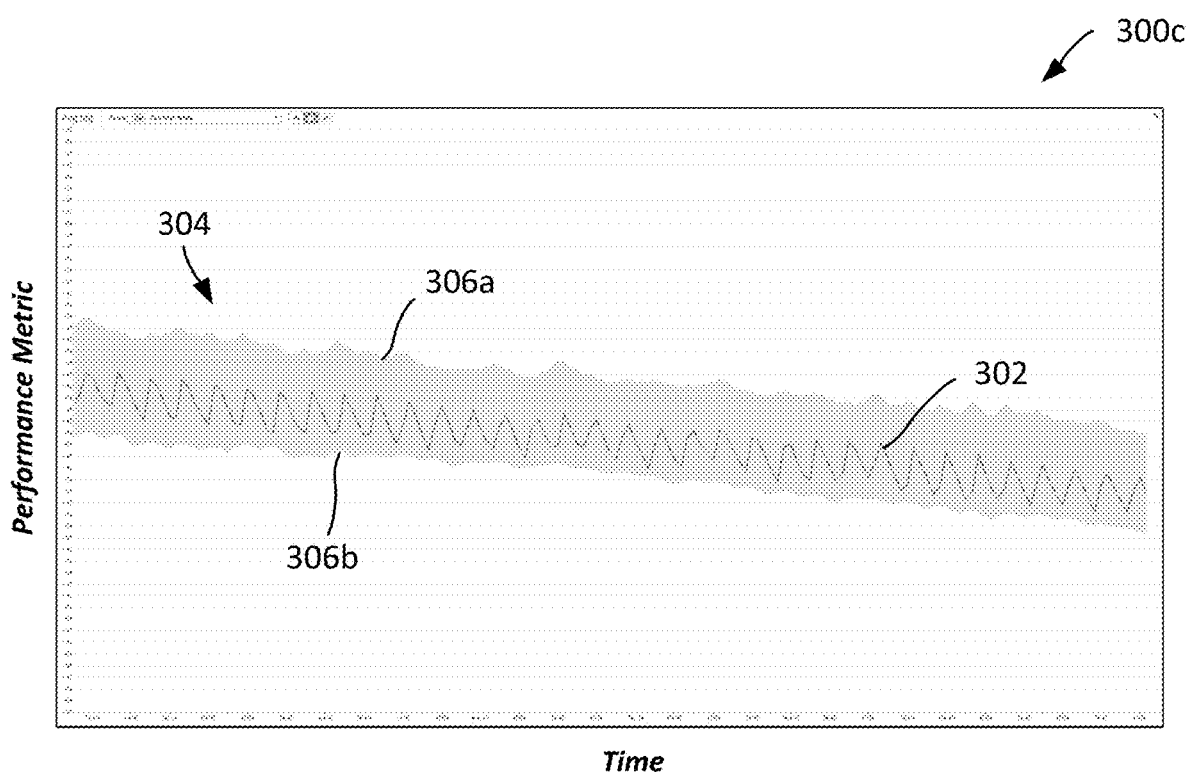

The forecast range 304 can be determined such that it also accounts for a "trend" of the performance metric. The trend can refer, for example, to a general increase or decrease in the performance metric over time, even across one or more seasons. For example, as shown in plot 300c in FIG. 3C, the time-series data sequence 302 exhibits a recurring pattern of rising and falling over the period of time. However, the time-series data sequence 302 also exhibits a general downward trend (e.g., a negative slope) that extends across multiple "seasons." Accordingly, the forecast range 204 can be determined such that it accounts for both the seasonality and the trend.

In practice, the trend and/or the seasonality of a performance metric can vary, depending on the implementation. As an example, a computer system may experience a relatively higher load during the day, and experience a relatively lower load during the night. Further, the computer system may experience a gradually decreasing load across several days (e.g., corresponding to a decrease in the popularity of services offered by the computer system). Thus, the load of the computer system may be expected to have a day-to-day seasonality (e.g., having a pattern that repeats every day), as well as a downward trend. Accordingly, the platform 150 can determine a forecast range 304 that accounts for both the seasonality and the trend, such that it is less likely to identify anomalies erroneously. As another example, a computer system may experience a relatively higher load during weekdays, and experience a relatively lower load during weekends. Thus, the load of the computer system may be expected to have a week-to-week seasonality (e.g., having a pattern that repeats every week). Further, the computer system may experience a gradually increasing load across several days (e.g., corresponding to an increase in the popularity of services offered by the computer system). Thus, the load of the computer system may be expected to have a week-to-week seasonality (e.g., having a pattern that repeats every week), as well as an upward trend. Accordingly, the platform 150 can determine a forecast range 304 that accounts for both the seasonality and the trend, such that it is less likely to identify anomalies erroneously. Similarly, although example trends are described herein, these are merely illustrative examples. In practice, a performance metric can exhibit other trends, depending on the implementation.

In some cases, in response to identifying an anomaly, the platform 150 can generate a notification to a user alerting him to the anomaly. This can be beneficial, for example, as it enables the user to perform one or more corrective action more quickly. Notifications can include, for example, e-mail messages, chart messages, text messages (e.g., Short Message Service messages), telephone messages, voicemail messages, fax messages, or other forms to communication used to convey auditory and/or visual information. In some cases, the platform 150 can transmit a notification to one or more of the client computer systems 108a-c (e.g., using the transmission module 204), such that a user of the client computer systems 108a-c can retrieve and review the notification (e.g., using the user interfaces 110a-c).

In some cases, a user can customize the manner in the platform 150 monitors one or more computer systems for anomalies and/or transmits notifications to users in response to identifying anomalies. For instance, a user can specify that the platform 150 monitor one or more particular performance metrics of one or more particular computer systems. Further, the user can specify the manner in which the platform 150 identifies anomalies (e.g., by specifying one or more particular techniques for determining forecast ranges for the performance metrics based on historical data). Further, the user can specify that the platform 150 transmit notifications in a particular manner upon identifying an anomaly. In this manner, a user can closely control each aspect of the anomaly detection process to suit his specific needs.

Figure 4A:
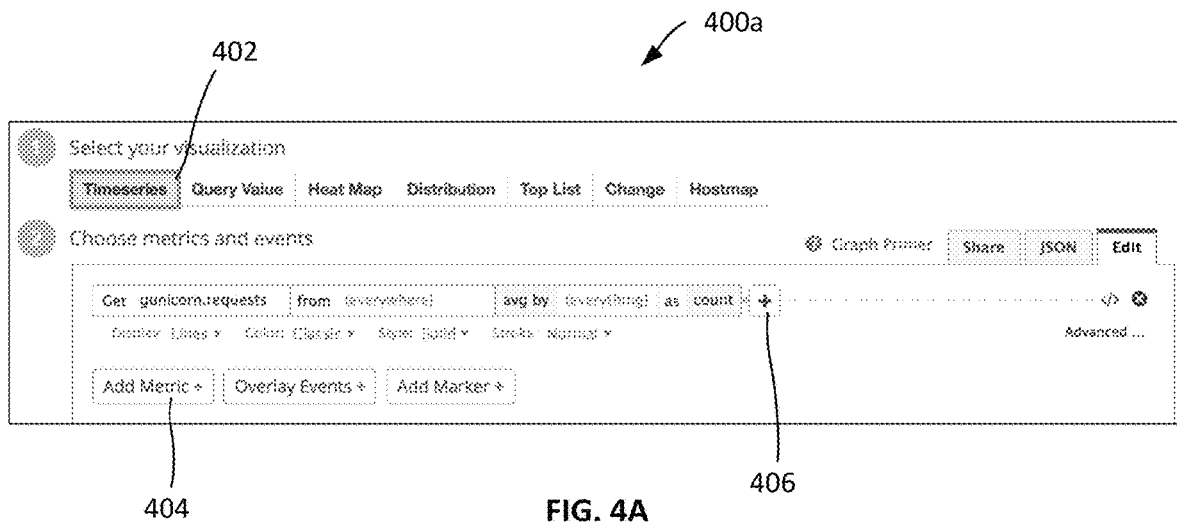
FIG. 4A-4D are diagrams of example user interfaces.
Figure 4B:
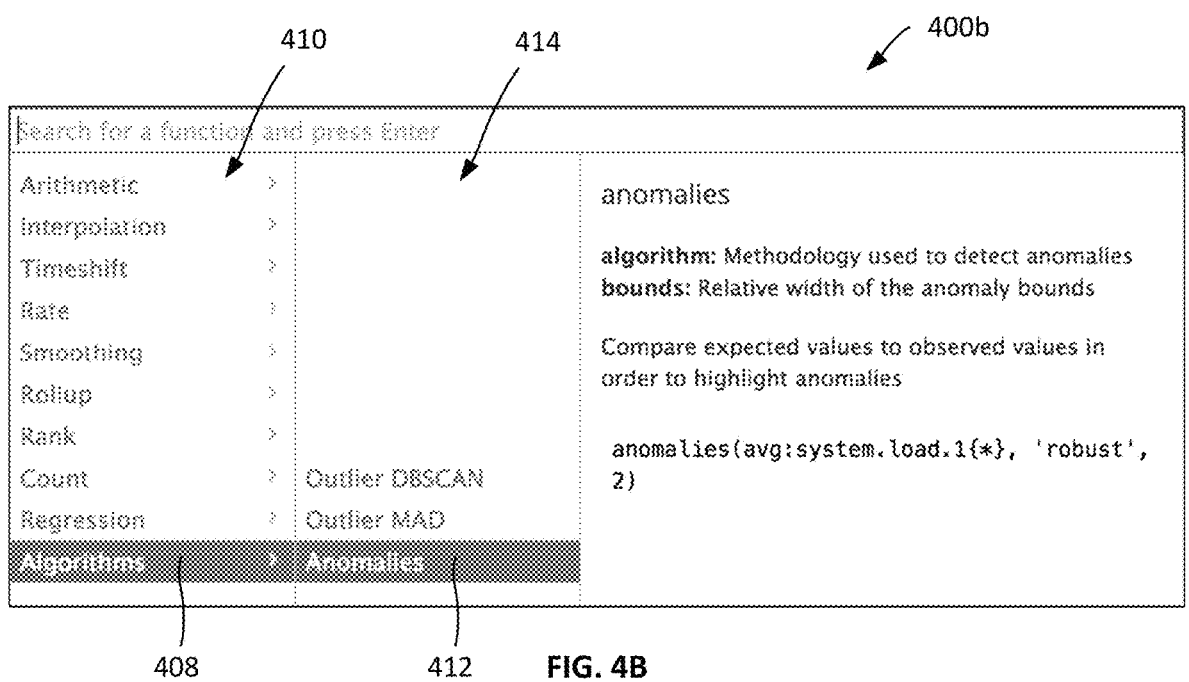
Figure 4C:
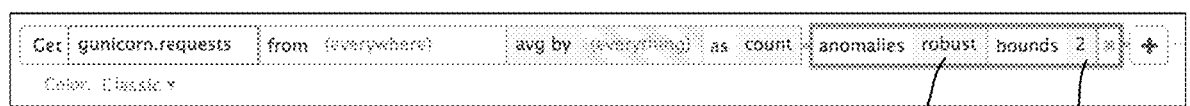

An example process for customizing the operation of the platform 150 is shown in FIGS. 4A-4C.

As shown in FIG. 4A, to initiate a monitoring process, a user can select a "timeseries" command 402 on a user interface 400a. Further, the user can select the "add metric" command 404, and select a particular performance metric of interest. This specifies that the user wishes to visualize the selected performance metric in the form of a time series representation (e.g., a visual plot).

Further, the user can select a "+" command 406 on the user interface 400a. In response, a user is presented with a user interface 400b (e.g., as shown in FIG. 4B). The user interface 400b enables the user to specify particular functions and modifiers that can be performed and/or applied with respect to the selected performance metric. To enable the monitoring process, the user can select the "algorithms" item 408 from the menu 410, and select the "anomalies" item 412 from the sub-menu 414. Upon selection of the "anomalies" item 412, the user interface 400a is updated to reflect the selection (e.g., as shown in FIG. 4C).

The user interface 400a enables the user to modify various parameters of the monitoring process. For example, the user can select and modify a first field 416a to specify a particular technique that should be used for determining an expected range of the performance metric. Example techniques include a "robust" technique, an "agile" technique, an "adaptive" technique, and a "standard" technique. These example techniques are described in greater detail below.

Further, the user can select and modify a second field 416b to adjust the bounds or tolerance of the forecast range of the performance metric. For example, a larger value can increase the forecast range (e.g., increasing the upper bound of the forecast range and/or decreasing the lower bound of the forecast range). As another example, a smaller value can decrease the forecast range (e.g., decreasing the upper bound of the forecast range and/or increasing the lower bound of the forecast range).

The platform 150 generates a visual representation of the performance metric based on the user's selections. As an example, the platform 150 can generate a plot (e.g., similar to those shown with respect to FIGS. 3A-3C). The plots can include a visual representation of the performance metric over time (e.g., a line plot of a time-series data sequence), overlaid onto a visual representation of the forecast range of the performance metric (e.g., a shaded, colored, and/or patterned region). The plot can also indicate when the performance metric becomes anomalous and deviates from the forecast range (e.g., by indicating the anomalous portion of the time-series data sequence using a different shade, color, and/or pattern).

Further, a user can specify that the platform 150 transmit one or more notifications to him when one or more analogies are detected. The user can also specify the circumstances or conditions that must be met before a notification is transmitted. This can be useful, for example, as it enables the user to customize the manner in which he is notified.

Figure 4D:
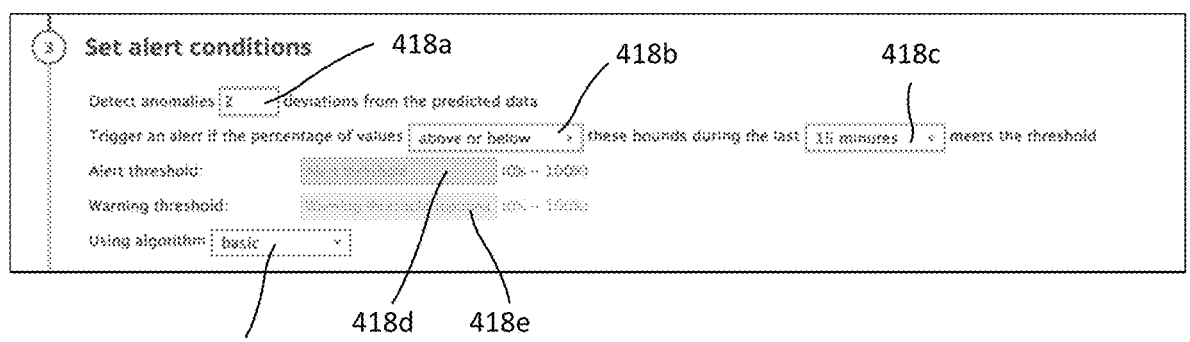

For example, as shown in FIG. 4D, a user can access a user interface 400c, and modify various condition fields 418a-f to adjust the notification behavior of the platform 150. For example, the user can adjust the condition field 418a to adjust the bounds or tolerance of the expected range of the performance metric. This can have a similar effect as the second field 416b in user interface 400a. For example, a larger value can increase the forecast range (e.g., increasing the upper bound of the forecast range and/or decreasing the lower bound of the forecast range). As another example, a smaller value can decrease the forecast range (e.g., decreasing the upper bound of the forecast range and/or increasing the lower bound of the forecast range).

As another example, the user can adjust the condition fields 418b-f to adjust the amount of "anomalous" measurements that must be observed over a particular period of time before a notification is generated. This can be useful, for example, in reducing the likelihood that a notification will be transmitted for a fleeting or momentary anomaly (e.g., an anomaly that occurs for only a short period of time).

For example, the user can adjust the condition field 418b to specify that values above and/or below the bounds are to be considered "anomalous" (e.g., values above the upper bound of the forecast range and/or values below the lower bound of the forecast range). Further, the user can adjust the condition field 418c to specify the span of time of the performance metric that is to be considered. Further, the user can adjust the condition field 418d to specify the percentage of "anomalous" values (e.g., values above the upper bound of the forecast range and/or values below the lower bound of the forecast range) that must occur over the specified span of time for a high priority "alert" notification to be transmitted. Further, the user can adjust the condition field 418e to specify the percentage of "anomalous" values (e.g., values above the upper bound of the forecast range and/or values below the lower bound of the forecast range) that must occur over the specified span of time for a lower priority "warning" notification to be transmitted. Further, the user can adjust the condition field 418f to specify a particular technique that should be used for determining a forecast range of the performance metric. This can have a similar effect as the first field 416a in user interface 400a. For example, techniques can include a "robust" technique, an "agile" technique, an "adaptive" technique, and a "standard" technique.

When the conditions specified in the user interface 400c are fulfilled, the platform 150 transmits a notification to the user. Notifications can include, for example, e-mail messages, chart messages, text messages, telephone messages, voicemail messages, fax messages, or other forms to communication used to convey auditory and/or visual information.

A described herein, various techniques can be used to determine a forecast range of a performance metric. Example techniques include a "robust" technique, an "agile" technique, an "adaptive" technique, and a "standard" technique.

Further, different techniques can have different properties, and may be particularly suitable in different circumstances. For example, a "standard" technique may be particularly suited for determining a forecast range of a performance metric that does not have a repeating seasonal pattern. As another example, an "agile" technique may be particularly suited for determining a forecast range of a performance metric that quickly shifts over time. As another example, a "robust" technique may be particularly suited for determining a forecast range of a performance metric that is relatively stable over time, and in which relatively slow shifts in the metric may be indicative of an anomaly. As another example, an "adaptive" technique may be particularly suited for determining a forecast range of a performance metric that changes dynamically over time, and in which the use of other techniques (e.g., "agile" or "robust") may result in frequent false positives.

In some cases, some or all of the techniques can be agnostic to the type of data being monitored. For example, as described herein, the techniques can be used to monitor one or more performance metrics associated with operations performed on the computer systems. Each of these metrics could pertain to a different property or characteristics and/or indicate one or more values according to different units. Nevertheless, in some cases, some or all of the techniques can be used to monitor these properties, regardless of what property or characteristic is being measured, and regardless of the units of each measurement. This can be beneficial, for example, as it enables the techniques to be used across a wide array of different time-series data sequences, regardless of the specific properties or characteristics that they represent. This further allows the anomaly detection process to be used with and across a wide variety of computing platforms and/or services without needing to be specially configured for such platforms and/or services.

In an example implementation, the "standard" technique can be performed by determining a lagging rolling quantile of the measured performance metric over time. This technique can be advantageous, for example, as it considers a relatively small amount of data, and can adjust relatively quickly to changing conditions in the measured performance metric. However, the "standard" technique does not account for a seasonal behavior of a measured performance metric. Further, the "standard" technique does not account for relatively longer trends in the measured performance metric. Nevertheless, the "standard" technique can be useful in determining forecast ranges for certain performance metrics (e.g., performance metrics that are not expected to have seasonality or long-term trends).

Figure 5A:
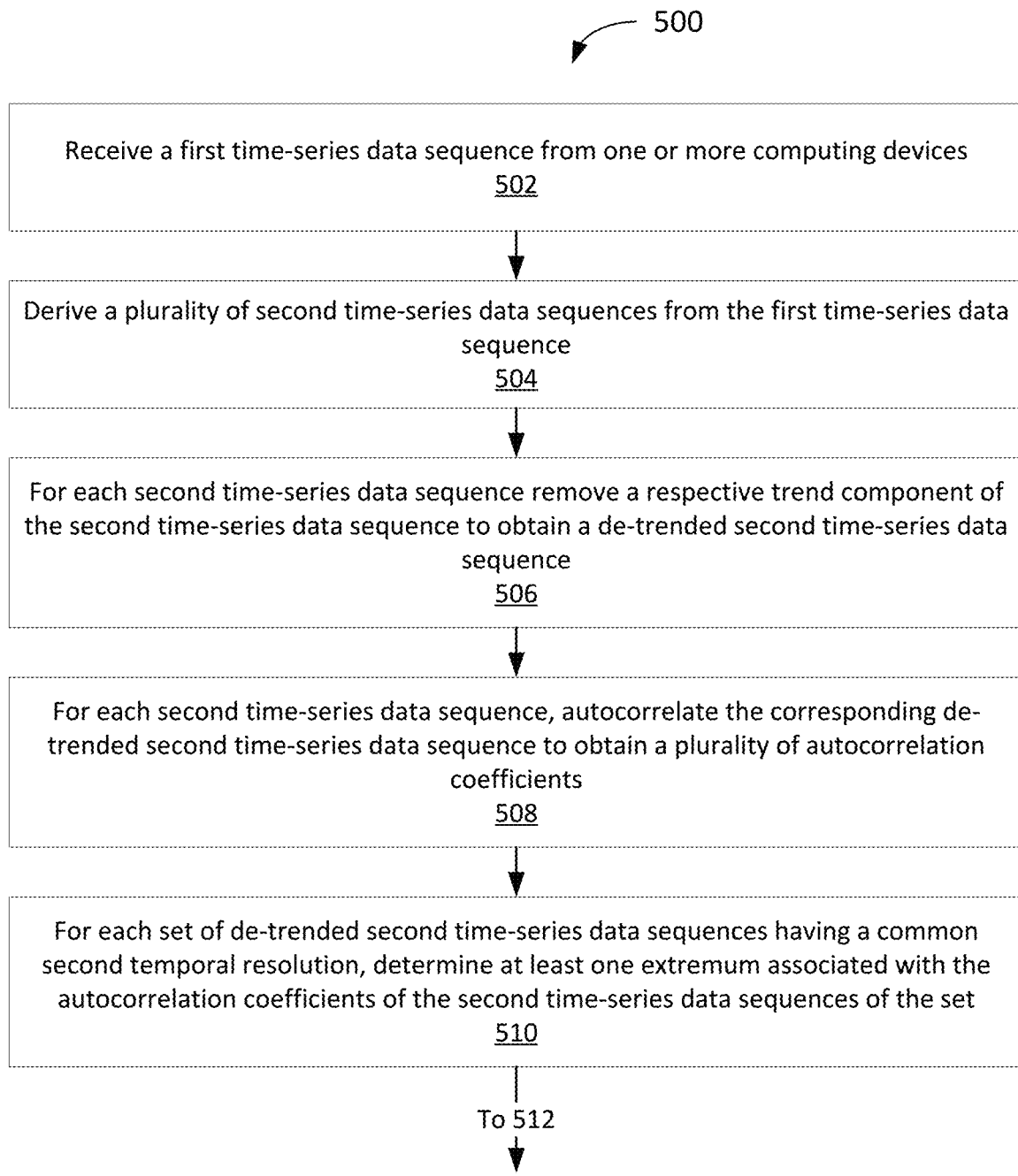
FIGS. 5A and 5B are flow chart diagrams of an example process for determining a seasonality in a time-series data sequence.
Figure 5B:
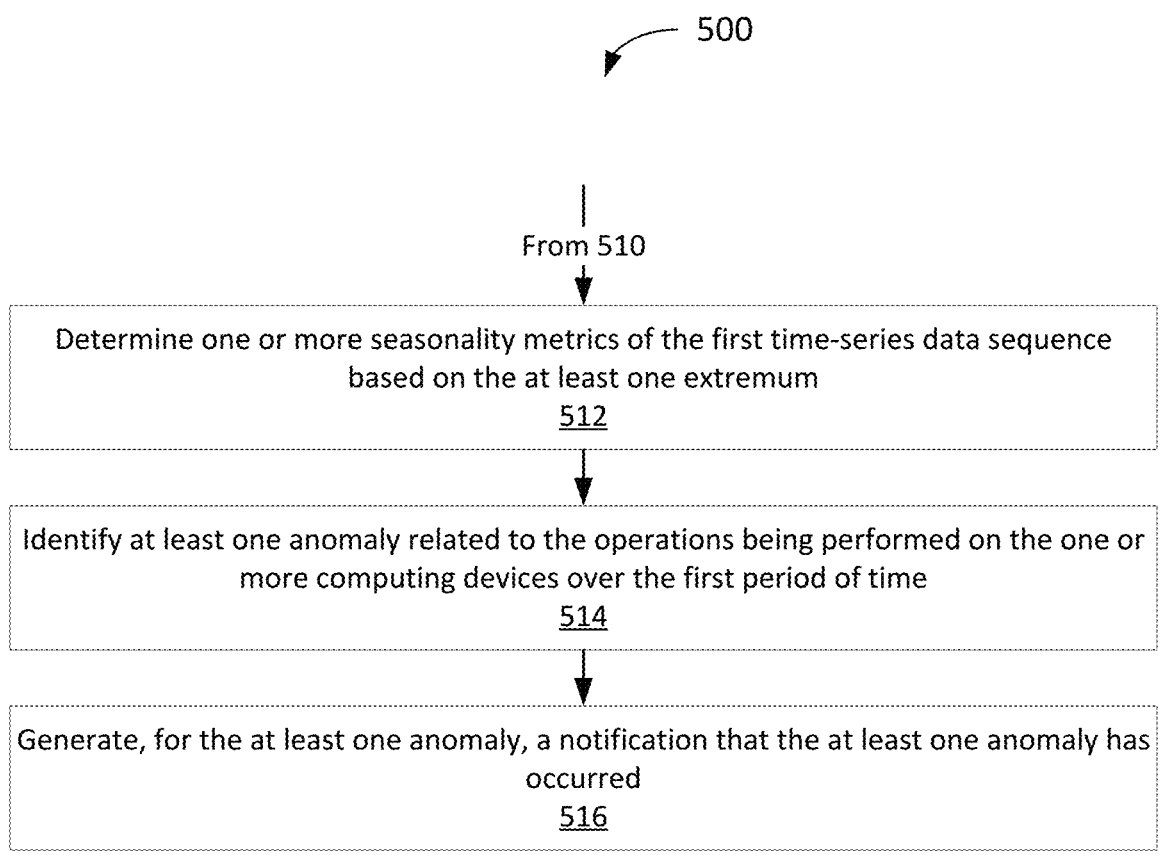

The "robust" technique, the "agile technique," and the "adaptive technique" can be performed by initially detecting a seasonality in the measured performance metric. An example process 500 for determining a seasonality in a time-series data sequence is shown in FIGS. 5A and 5B. The process 500 can be performed, for example, using one or more components of the system 100 (e.g., by performing steps 502, 504, 506, 508, 510, and 512).

In the process 500, one or more server devices receive a first time-series data sequence from one or more computing devices (step 502). The first time-series data sequence indicates a performance metric associated with operations performed on the one or more computing devices over a first period of time. As an example, the server computer system 102 can receive a time-series data sequence from the computer systems 104a and/or 104b describing the performance of the computer systems 104a and/or 104b over the first period of time.

In practice, the first period of time can vary, depending on the implementation. The first period of time can refer, for example, to the period of time spanning between the first and last measurements in the time-series data sequence. For instance, in some cases, the time-series data sequence can include measurements of the performance metric spanning a particular period of time (e.g., one or more seconds, one or more hours, one or more days, one or more months, or any other period of time).

Further, the first time-series data sequence can have a first temporal resolution. The temporal resolution can refer, for example, to the frequency of measurements of the performance metric. In practice, the first temporal resolution can vary, depending on the implementation. For example, the first time-series can have a temporal resolution of one second (e.g., one measurement every second), one minute (e.g., one measurement every minute), one hour (e.g., one measurement every hour), or any other temporal resolution The server device derives a plurality of second time-series data sequences from the first time-series data sequence (step 504). Each second time-series data sequence can include a respective second temporal resolution that is less than the first temporal resolution. Further, each second time-series data sequence can indicate the performance metric over a respective second period of time less than the first period of time.

As an example, from the original first time-series data sequence (e.g., a relatively longer, high frequency time-series data sequence), several shorter second time-series data sequences can be extracted (e.g., several time-series data sequences, each spanning a period of time shorter than that of the first time-series data sequence). Each second time-series data sequence can span a different period of time as some of the other second time-series data sequences and/or span a similar period of time as some of the other second time-series data sequences.

Further, each of the second time-series data sequence can indicate aggregated measurements from the first time-series data sequence. For example, at least some of the measurements indicated by the second time-series data sequences can be an aggregate of two measurements indicated by the first time-series data sequence. This has the effect of reducing the temporal resolution of the second time-series data sequence. For instance, the second time-series data sequence can aggregate multiple measurements together, such that each value of the second time-series data sequence represents many values in the original first time-series data sequence. In some cases, measurements can be aggregated by determining the average of a set of measurements (e.g., mean, median, etc.), a maximum value of the measurements, a minimum value of the measurements, or some other metric for representing the measurements as a single value.

In practice, different aggregation "levels" are possible. For example, in some cases, each value in a particular second time-series data sequence can be an aggregate of two, three, four, or more measurements of the first time-series data sequences. In some cases, to allow detection of each seasonality, multiple different aggregation levels can be used, such that there exists for each seasonality an aggregation level that is granular enough to allow detection of the seasonality (e.g., having a sufficiently high temporal resolution), but not so granular that it becomes prohibit computationally expensive to process them (e.g., having an impractically high temporal resolution). In some cases, multiple different second time-series data sequences can be generated according to multiple different aggregation levels. Further, for each aggregation level, multiple different second time-series data sequences can be generated, each spanning a different period of time (e.g., having a different time "window"). The time windows can be selected such that each time window is long enough to include several seasons of each seasonality.

For each second time-series data sequence, the server device removes a respective trend component of the second time-series data sequence to obtain a de-trended second time-series data sequence (step 506). This can be performed, for example, by calculating a centered rolling median of each second time-series data sequence.

Further, for each second time-series data sequence, the server device autocorrelates the corresponding de-trended second time-series data sequence to obtain a plurality of autocorrelation coefficients (step 508). Each autocorrelation coefficient can correspond to a different respective autocorrelation time lag. Performing an autocorrelation refers, for example, to determining a correlation of a data sequence with a delayed copy of itself (e.g., a copy of the data sequence according to a particular time lag) as a function of delay. The result indicates the similarity between observations as a function of the time lag between them. Autocorrelations can be performed, for example, using Kendall's tau correlation coefficient.

For each set of de-trended second time-series data sequences having a common second temporal resolution, the server device determining at least one extremum associated with the autocorrelation coefficients of the second time-series data sequences of the set (step 510). For example, for all of the de-trended second time-series data sequences having a common aggregation level (e.g., a common temporal resolution), the autocorrelation coefficients calculated for those data sequences can be combined by calculating medians over the values computed for the same lags across the data sequence. Accordingly, each combined autocorrelation coefficient corresponds to a particular autocorrelation lag time. Further, the series of autocorrelations from each aggregation level can be analyzed to determine local maximums. In some cases, a particular autocorrelation lag time can be considered a local maximum when its autocorrelation coefficient is larger than all the other autocorrelation coefficients with a radius r of the lag time. In some cases, the radius r can be a tunable parameter (e.g., determined empirically by a user based on historical data).

The server device determines one or more seasonality metrics of the first time-series data sequence based on the at least one extremum (step 512). Each seasonality metric corresponds to a respective periodic time interval for which the first time-series data exhibits recurring variation. In some cases, the one or more seasonality metrics correspond to all of the autocorrelation lag times having autocorrelation coefficients that exceed a threshold value. In some cases, the threshold value can be a tunable parameter (e.g., determined empirically by a user based on historical data).

As an example, a performance metric may exhibit a one day seasonality (e.g., exhibit recurring variation according to a one day pattern). Accordingly, the server computer can determine a seasonality metric identifying the one day seasonality. In some cases, a performance metric may exhibit multiple different seasonalities. As an example, a performance metric may exhibit a one day seasonality (e.g., exhibit recurring variation according to a one day pattern), as well as a one week seasonality (e.g., exhibit recurring variation according to a one week pattern). Accordingly, the server computer can determine a seasonality metric identifying the one day seasonality, and another seasonality metric identifying the one week seasonality.

The server device identifies at least one anomaly related to the operations being performed on or by the one or more computing devices over the first period of time (step 514). This can be performed, for example, using a "robust" technique," an "agile" technique, or an "adaptive" technique (described in greater detail below).

Further, in response, the server device generates, for the at least one anomaly, a notification that the at least one anomaly has occurred (step 516). In some cases, the server computer can generate a notification to a user alerting him to the anomaly. Notifications can include, for example, e-mail messages, chart messages, text messages (e.g., Short Message Service messages), telephone messages, voicemail messages, fax messages, or other forms to communication used to convey auditory and/or visual information.

In an example implementation, the "robust" technique can be performed by decomposing a measured performance metric into its seasonal components (reflecting a recurring or periodic pattern) and trend components (reflecting a continuing change in the metric over time). This technique can be advantageous, for example, as it is relatively stable, and generates forecast ranges that relatively constant (e.g., even during the course of long lasting anomalies). As a tradeoff, the "robust" technique may take longer to account for intended level shifts in a performance metric (e.g., a change in the level of a performance metric due to an intended change in a computer system's configuration, such as a change in the computer systems' programming code). Further, this technique can be performed using a subset of the measured performance metric data available to a monitoring system, rather than the entirety of the measured performance metric data available to the monitoring system. Thus, a monitoring system can operate using less memory and fewer computational resources (e.g., lower processor utilization) than might otherwise be required with conventional techniques.

Figure 6A:
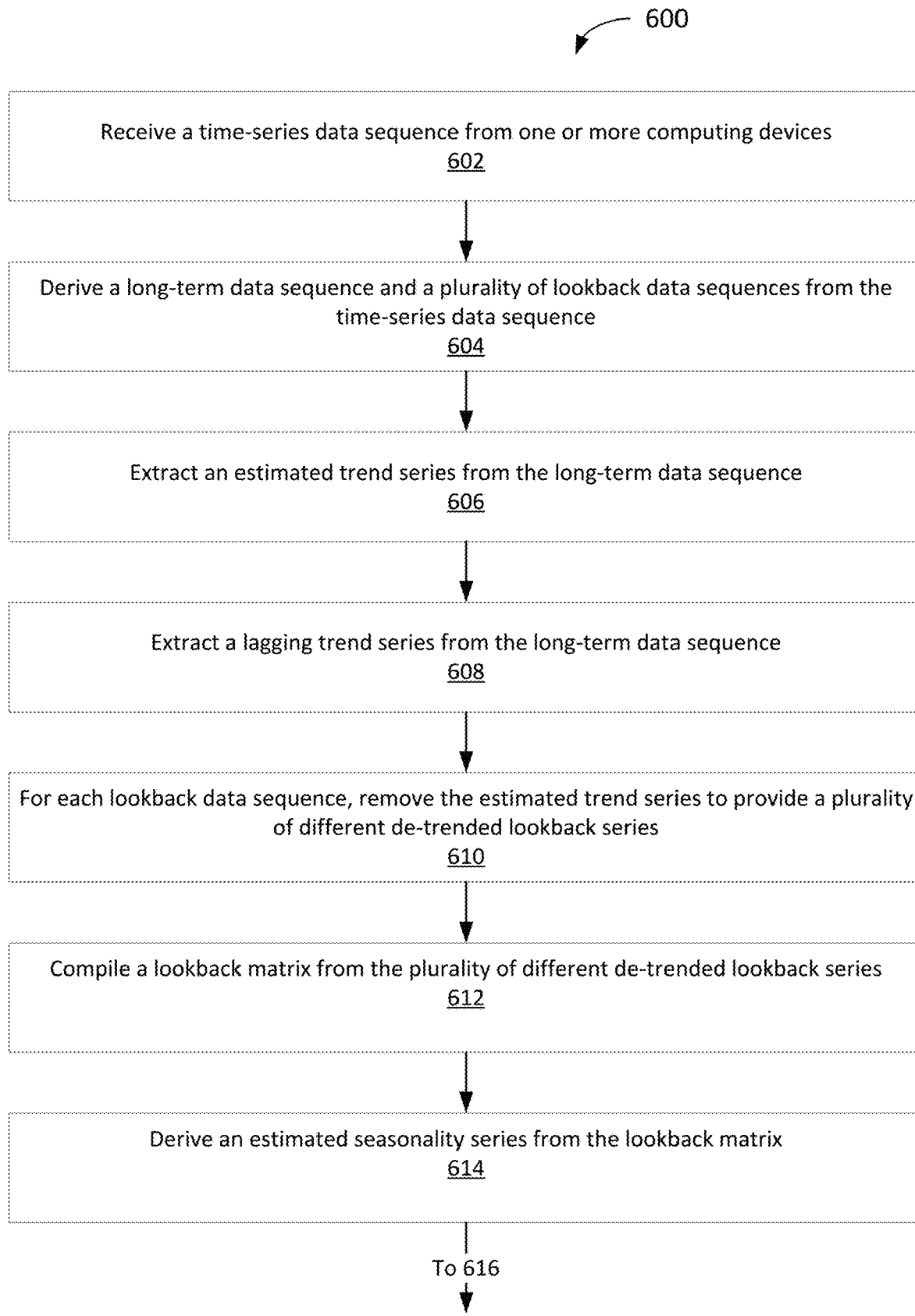
FIGS. 6A and 6B are flow chart diagrams of an example process for robustly detecting anomalies within a time-series data sequence according to a "robust" technique
Figure 6B:
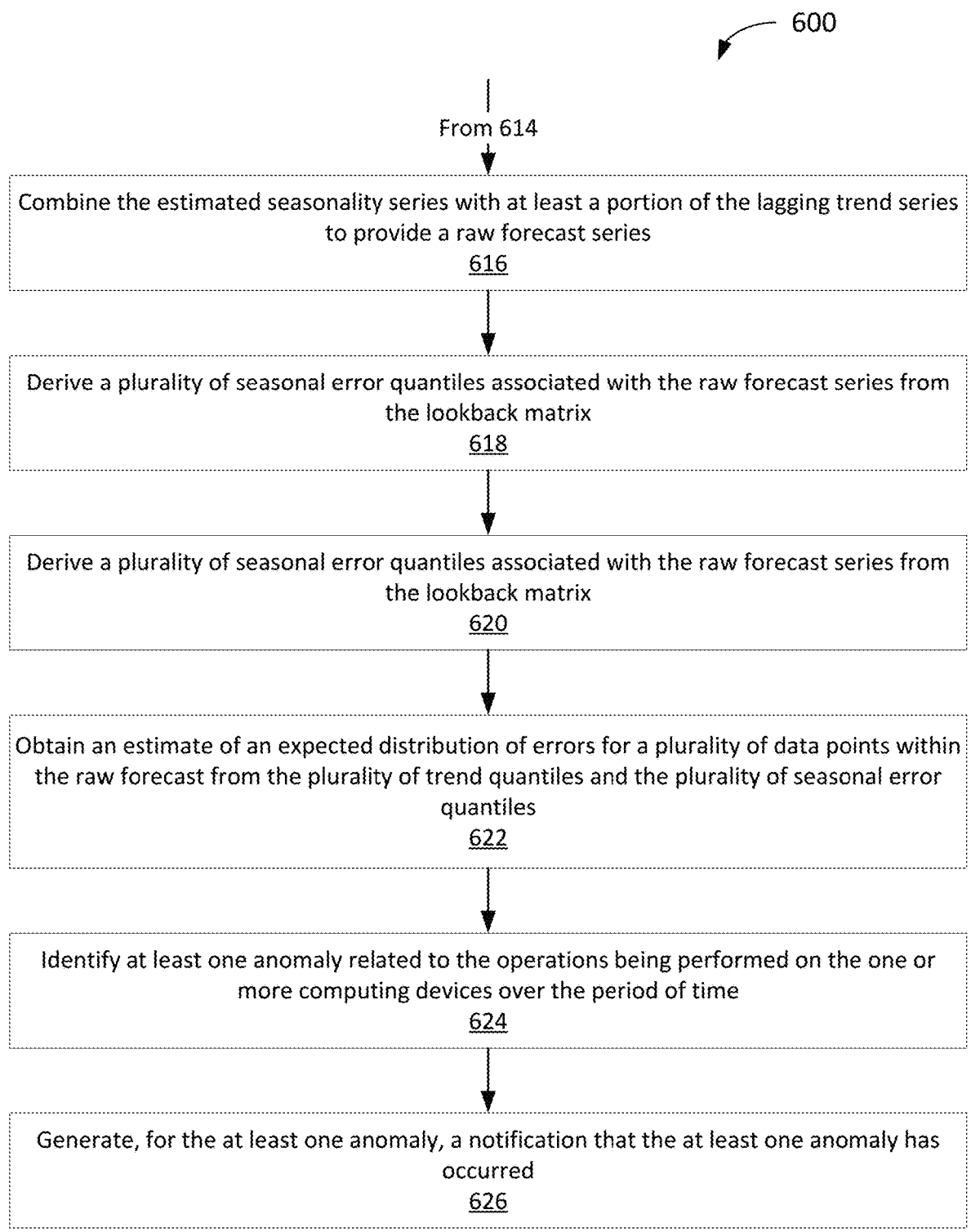

An example process 600 for robustly detecting anomalies within a time-series data sequence using the "robust" technique is shown in FIGS. 6A and 6B. The process 600 can be performed, for example, using one or more components of the system 100.

In the process 600, one or more server devices receive the time-series data sequence from one or more computing devices (step 602). The time-series data sequence indicates a performance metric associated with operations performed on the one or more computing devices over a period of time. As an example, the server computer system 102 can receive a time-series data sequence from the computer systems 104a and/or 104b describing the performance of the computer systems 104a and/or 104b over the period of time.

The server device derives a long-term data sequence and a plurality of lookback data sequences from the time-series data sequence (step 604). The long-term data sequence includes a first temporal resolution that is less than a temporal resolution of the time-series data sequence. Each lookback data sequence includes a different corresponding second temporal resolution that is less than the first temporal resolution.

As an example, to obtain the long-term data sequence, the time-series data sequence can be queried with an aggregation level $\alpha_{lt}$ such that the number of points per season is enough to capture the shape of the season without being prohibitively large. For example, in some cases, each value in the long-term data sequence can be an aggregate of two, three, four, or more measurements of the first time-series data sequences.

Further, the long-term data sequence will cover the range:

$$[t_s-(k+1)*s, t_e]$$

The aggregation level refers to the number of series in each record or data item in the time-series extracting, by the at least one processor, an estimated trend series from the long-term data sequence. The seasonality s refers to the length of a season in seconds. This can be determined, for example, using the process 500 shown in FIGS. 5A-5B (e.g., by performing steps 502, 504, 506, 508, 510, and 512). The time window over which to detect anomalies is indicated by $t_s$ (representing the starting time stamp of the time window) and $t_e$ (representing the ending time stamp of the time window). The number of seasons of historical data that will be used for training the model is indicated as k.

As an example, to obtain the plurality of lookback data sequences, the time-series data sequence can be queried to obtain k different time series, each having an aggregation level a and having ranges $$[t_s-j*s, t_e-j*s] \text{ for } j=1,\ldots,k$$

The server device extracts an estimated trend series from the long-term data sequence (step 606). This can be performed, for example, by taking a centered rolling median (with window size s/α$_{lt}$) over the long-term data sequence.

The server device also extracts a lagging trend series from the long-term data sequence (step 608). This can be performed, for example, by taking a lagging rolling median (with window size s/α$_{lt}$) over the long-term data sequence.

For each lookback data sequence, the server device removes the estimated trend series to provide a plurality of different de-trended lookback series (step 610). This can be performed, for example, by subtracting the estimated trend series from each of the lookback data sequences. Linear interpolation can be used to find any values of estimated trend series for which timestamps do not already exist.

The server device compiles a lookback matrix from the plurality of different de-trended lookback series (step 612). This can be performed, for example, by constructed a k-by-(($t_e$−$t_s$)/α) lookback matrix by sliding the lookback data sequence through time to all start at time $t_s$.

The server device derives an estimated seasonality series from the lookback matrix (step 614). This can be performed, for example, by rolling a centered triangularly-weighted median with a small window size over the second axis of the lookback matrix. The timestamps associated with the estimated seasonality series are the timestamps from $t_s$ to $t_e$ spaced α seconds apart.

The server device combines the estimated seasonality series with at least a portion of the lagging trend series to provide a raw forecast series (step 616). This can be performed, for example, by adding to each value in the estimated seasonality series the most recent value in lagging trend series.

The server device derives a plurality of trend error quantiles from the estimated trend series and the lagging trend series (step 618). This can be performed, for example, by determined quantiles of the set of pairwise differences between the estimated trend series and the lagging trend series.

The server device derives a plurality of seasonal error quantiles associated with the raw forecast series from the lookback matrix (step 620). This can be performed, for example, by calculating a matrix of seasonal error quantiles by subtracting the vector of estimated seasonality values from each row in the lookback matrix and then taking rolling quantiles (with a small window size) along the second axis of this matrix. The result is a set of quantiles capturing the distribution of seasonal errors for each timestamp in the raw forecast series.

The server device obtains an estimate of an expected distribution of errors for a plurality of data points within the raw forecast from the plurality of trend quantiles and the plurality of seasonal error quantiles (step 622). This can be performed, for example, by estimating, for each point in raw forecast series, an expected distribution of errors from the combination of the trend error quantiles and seasonal error quantiles at the given point in time. At each point, a low and high quantile can be taken from this distribution and added to the value in the raw forecast series to get lower and upper bounds, respectively. These lower and upper bounds can be used, for example, as the lower and upper bounds of a forecast range for the performance metric.

The server device identifies at least one anomaly related to the operations being performed on the one or more computing devices over the period of time (step 624). Each anomaly can correspond to a respective time interval during which the time-series data sequence deviated from the forecast range for the performance metric. As an example, if the time-series data sequence exceeds the upper bound of the forecast range and/or drop below the lower bound of the forecast range, the server device can identify that an anomaly has occurred.

Further, in response, the server device generates, for the at least one anomaly, a notification that the at least one anomaly has occurred (step 626). In some cases, the server computer can generate a notification to a user alerting him to the anomaly. Notifications can include, for example, e-mail messages, chart messages, text messages (e.g., Short Message Service messages), telephone messages, voicemail messages, fax messages, or other forms to communication used to convey auditory and/or visual information.

In an example implementation, the "agile" technique can be performed by determining a forecast range of a measured performance metric based on the immediate past values of the measured performance metric. This technique enables the forecast range to be updated quickly to account for level shifts in the measured performance metric. As a tradeoff, the "agile" technique can sometimes be less robust with respect to recently occurring and long-lasting anomalies. This technique can be particularly suitable, for example, for monitoring seasonal performance metrics in a manner that quickly adjust to level shifts in the performance metric. Similarly, this technique also can be performed using a subset of the measured performance metric data available to a monitoring system, rather than the entirety of the measured performance metric data available to the monitoring system. Thus, a monitoring system can operate using less memory and fewer computational resources (e.g., lower processor utilization) than might otherwise be required with conventional techniques.

Figure 7A:
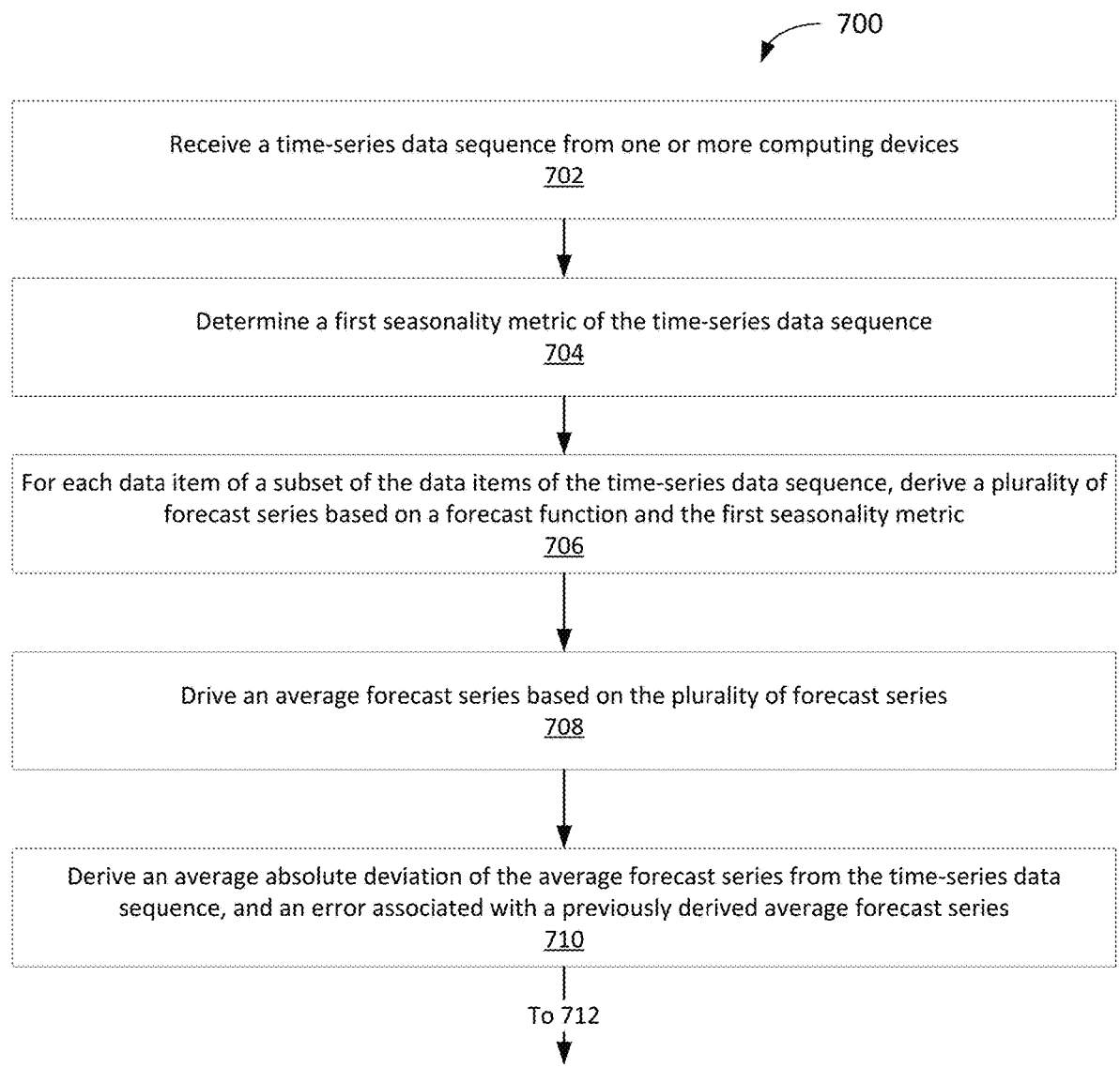
FIGS. 7A and 7B are flow chart diagrams of an example process for robustly detecting anomalies within a time-series data sequence using according to an "agile" technique
Figure 7B:
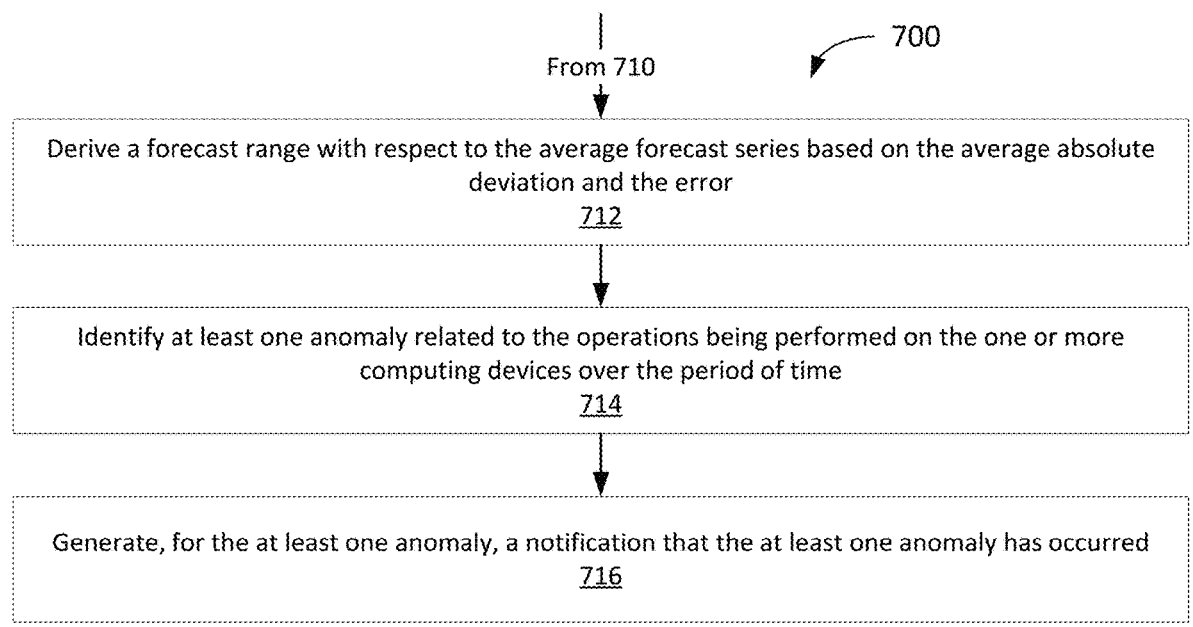

An example process 700 for robustly detecting anomalies within a time-series data sequence using the "agile" technique is shown in FIGS. 7A and 7B. The process 700 can be performed, for example, using one or more components of the system 100.

In the process 700, one or more server devices receive the time-series data sequence from one or more computing devices (step 702). The time-series data sequence indicates a performance metric associated with operations performed on the one or more computing devices over a period of time. As an example, the server computer system 102 can receive a time-series data sequence from the computer systems 104a and/or 104b describing the performance of the computer systems 104a and/or 104b over the period of time. The time-series data sequence can include a plurality of data items, each data item corresponding to a respective measurement of the performance metric obtained during the period of time.

The server device determines a first seasonality metric of the time-series data sequence (step 704). The first seasonality metric corresponding to a first periodic time interval for which the time-series data exhibits recurring variation. This can be determined, for example, using the process 500 shown in FIGS. 5A and 5B (e.g., by performing steps 502, 504, 506, 508, 510, and 512).

For each data item of a subset of the data items of the time-series data sequence, the server device derives a plurality of forecast series based on a forecast function and the first seasonality metric (step 706). This can be performed, for example, using the forecast function:

$$H_t(i,j,k) = X_{t-js-i} + (X_{t-ks} - X_{t-(j+k)s-i}) \text{ for } 1 \le i \le M, 0 \le j \le L-1, 1 \le k \le L-j$$

Where $X_t$ is the value of the data item of the time-series data sequence at a time t, L is the number of seasons being considered, and M is the number of points or data items considered within a single season.

Further, the server devices derives an average forecast series based on the plurality of forecast series (step 708). This can be performed, for example, using the average forecast function:

$$F_t = \text{median}_{i,j,k}(H_t(i,j,k))$$

For instance, server device can query the time-series data sequence for the L seasons worth of M+W points or data items, where W is the number of points or data items that are being considered during the anomaly detection process. The server device can calculate $H_t(i,j,k)$ for each of the W points (using the forecast function above). Further, the server device can calculate $F_t$ for each of the W points (using the average forecast function above).

Further, the server device derives an average absolute deviation of the average forecast series from the time-series data sequence, and an error associated with a previously derived average forecast series (step 710). This can be performed, for example, by combining the median absolute deviation of the time-series data sequence and the error of the most recent window's forecast to create the upper and lower bound series.

The server device derives a forecast range with respect to the average forecast series based on the average absolute deviation and the error (step 712). This can be performed, for example, using the lower and upper bound series as the lower and upper bounds of a forecast range for the performance metric.

The server device identifies at least one anomaly related to the operations being performed on the one or more computing devices over the period of time (step 714). Each anomaly can correspond to a respective time interval during which the time-series data sequence deviated from the forecast range for the performance metric. As an example, if the time-series data sequence exceeds the upper bound of the forecast range and/or drop below the lower bound of the forecast range, the server device can identify that an anomaly has occurred.

Further, in response, the server device generates, for the at least one anomaly, a notification that the at least one anomaly has occurred (step 716). In some cases, the server computer can generate a notification to a user alerting him to the anomaly. Notifications can include, for example, e-mail messages, chart messages, text messages (e.g., Short Message Service messages), telephone messages, voicemail messages, fax messages, or other forms to communication used to convey auditory and/or visual information.

In an example implementation, the "adaptive" technique can be performed by generating multiple different forecast ranges using the "agile" technique (e.g., generating multiple different models or predictions based on different assumptions), and blending those ranges together in a weighted manner. This technique can be particularly suitable, for example, when other techniques (e.g., "agile" or "robust") are too sensitive to minor changes in the behavior of the measured performance metric. As this technique is dynamic, this can be used to generate a forecast range in a manner that adjusts more quickly to a measured performance metric's changes. On the other hand, in some cases, the forecast range may follow the performance metric more closely than with other techniques, which may be less suitable in some applications. Similarly, this technique also can be performed using a subset of the measured performance metric data available to a monitoring system, rather than the entirety of the measured performance metric data available to the monitoring system. Thus, a monitoring system can operate using less memory and fewer computational resources (e.g., lower processor utilization) than might otherwise be required with conventional techniques.

Figure 8A:
FIGS. 8A and 8B are flow chart diagrams of an example process for robustly detecting anomalies within a time-series data sequence using according to an "adaptive" technique
Figure 8B:
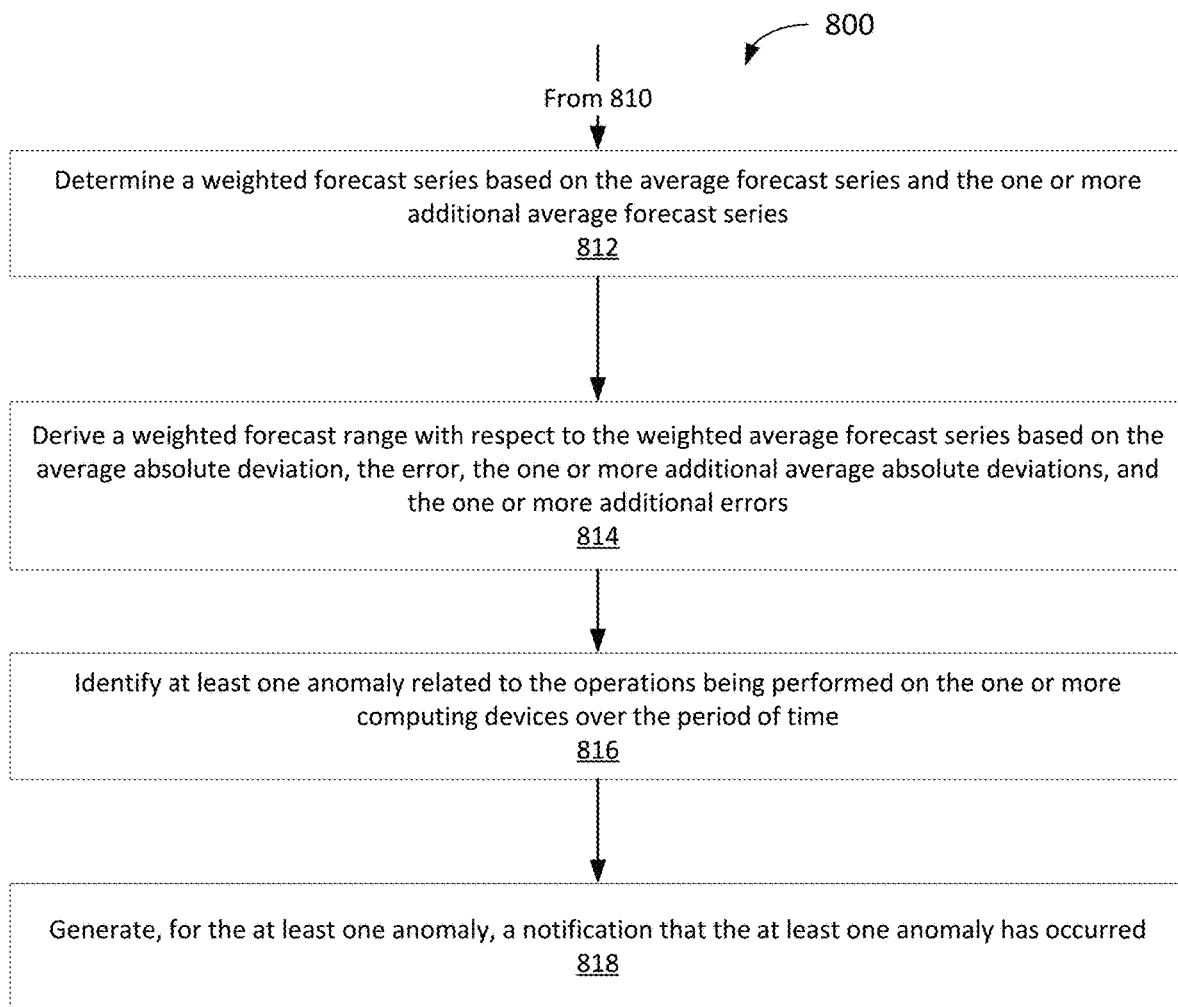

An example process 800 for robustly detecting anomalies within a time-series data sequence using the "adaptive" technique is shown in FIGS. 8A and 8B. The process 800 can be performed, for example, using one or more components of the system 100. Further, the process 800 can be performed in conjunction with the process 700 shown in FIGS. 7A and 7B (e.g., as one or more additional steps).

In general, the "adaptive" technique blends together several models determined using the "agile" technique by using an online weighted majority algorithm. Accordingly, the steps described with respect to the process 700 can be performed for each of one or more different seasonality metrics.

For example, the server device determines at least one additional seasonality metric of the time-series data sequence (step 802). Each additional seasonality metric corresponds to a different respective periodic time interval for which the time-series data exhibits recurring variation (e.g., a different seasonality of the time-series data sequence). Each additional seasonality metric can be determined, for example, using the process 500 shown in FIGS. 5A and 5B (e.g., by performing steps 502, 504, 506, 508, 510, and 512).

For each additional seasonality metric, the server device performs a number of steps. In particular, for each data item of an additional subset of the data items of the time-series data sequence, the server device derives a plurality of additional forecast series based on the forecast function and the additional seasonality metric (step 804). Further, the server device derives an additional average forecast series (step 806). This can be performed, for example, in a similar manner as discussed with respect to steps 706 and 708 of FIG. 7A.

For each additional seasonality metric, the server device further derives an additional average absolute deviation of the additional average forecast series from the time-series data sequence, and an additional error associated with a previously derived additional average forecast series (step 808). This can be performed, for example, in a similar manner as discussed with respect to step 710 of FIG. 7A.

For each additional seasonality metric, the service device further derives an additional forecast range with respect to the additional average forecast series based on the additional average absolute deviation and the additional error (step 810). This can be performed, for example, in a similar manner as discussed with respect to step 712 of FIG. 7B.

The server devices can repeat the steps 804, 806, 808, and 810 for each of the additional seasonality metrics.

The server device determines a weighted forecast series based on the average forecast series and the one or more additional average forecast series (step 812). This can be performed, for example, using an online weighted majority algorithm.

For instance, each average forecast series and additional average forecast series can be initially given a weight of one.

To weight each of these series, the following steps can be performed for each of M+W steps, where W is the number of points or data items that are being considered during the anomaly detection process, and M is the number of points or data items in the "runway" of the "adaptive" model (e.g., the number of points or data items that are input into the model to initialize the model, such as to create an initial set of forecast values). A weighted forecast series can be derived by taking the weighted sum of each of the initial average forecast series' values (e.g., the weighted sum of the average forecast series and the one or more additional average forecast series). The weights can be adjusted by multiplying them by exp(−E*error), where E is a tuning parameter (e.g., determined empirically by a user based on historical data). Subsequently, the weights can be re-normalized.

Similarly, the server device derives a weighted forecast range with respect to the weighted average forecast series based on the average absolute deviation, the error, the one or more additional average absolute deviations, and the one or more additional errors (step 814). In some cases, the weighted forecast range can be a weighted average of the forecast range determined based on the first seasonality metric (e.g., as described with respect to steps 710 and 712) and the one or more additional forecast ranges determined based on the one or more additional seasonality metrics (e.g., as described with respect to steps 808 and 810).

The server device identifies at least one anomaly related to the operations being performed on the one or more computing devices over the period of time (step 816). Each anomaly can correspond to a respective time interval during which the time-series data sequence deviated from the forecast range for the performance metric. As an example, if the time-series data sequence exceeds the upper bound of the forecast range and/or drop below the lower bound of the forecast range, the server device can identify that an anomaly has occurred.

Further, in response, the server device generates, for the at least one anomaly, a notification that the at least one anomaly has occurred (step 818). In some cases, the server computer can generate a notification to a user alerting him to the anomaly. Notifications can include, for example, e-mail messages, chart messages, text messages (e.g., Short Message Service messages), telephone messages, voicemail messages, fax messages, or other forms to communication used to convey auditory and/or visual information.

FIGS. 9A-9E show example performance metrics and forecast ranges of the performance metrics generated using the "standard," "robust," "agile," and "adaptive" techniques.

Figure 9A:
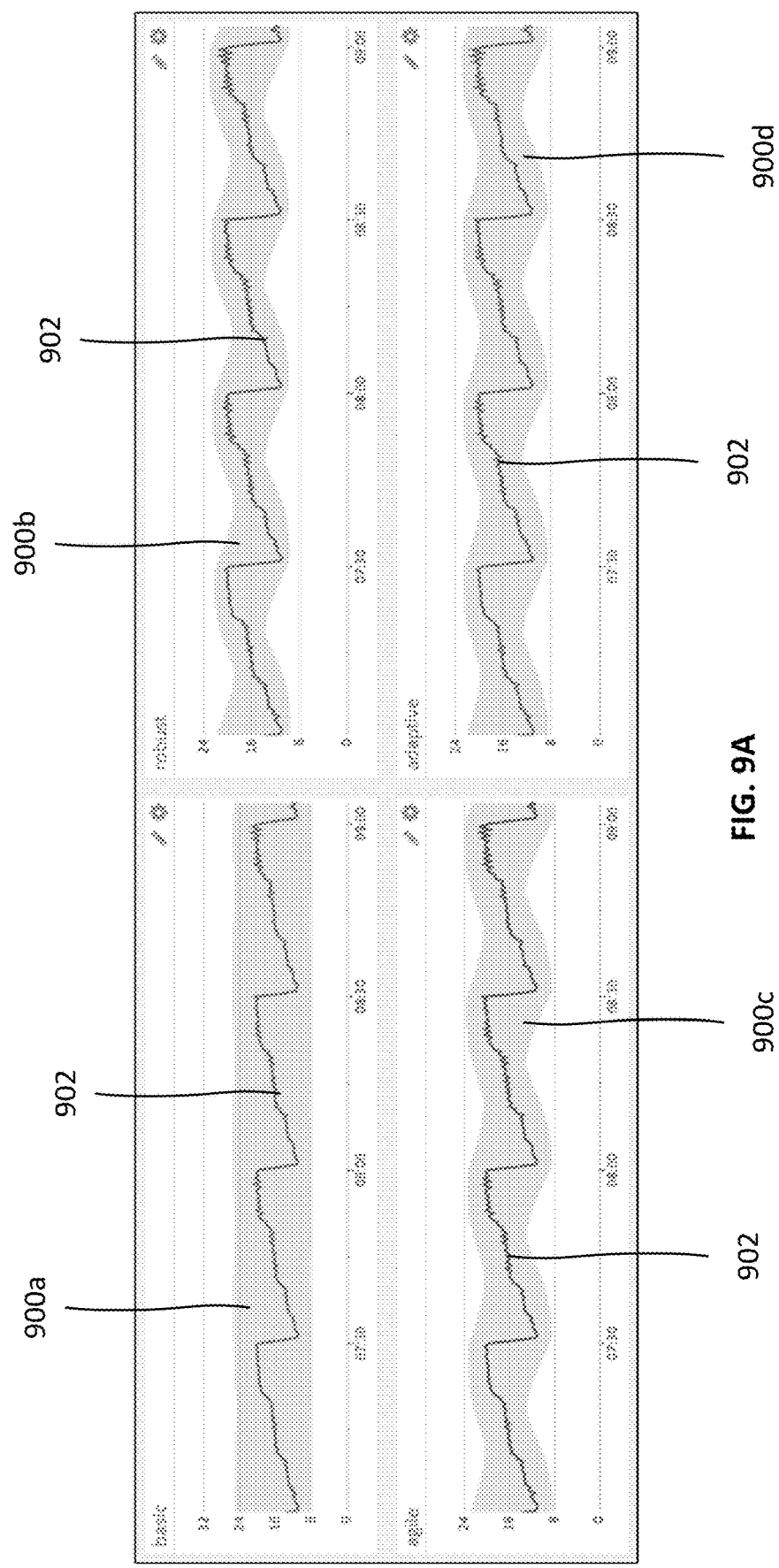
FIGS. 9A-9E are diagrams of example performance metrics and forecast ranges of the performance metrics generated using the "standard," "robust," "agile," and "adaptive" techniques.

FIG. 9A shows example forecast ranges 900a-d generated based on a common performance metric 902. As shown in FIG. 9A, the forecast range 900a generated using the "standard" technique successfully identify anomalies that spike out of the normal range of values, but it does not incorporate the repeating, seasonal pattern into its predicted range of values. By contrast, the forecast ranges 900b, 900c, and 900d (calculated by the "robust" technique, the "agile" technique, and the "adaptive" technique, respectively) each recognize the seasonal pattern and can detect more nuanced anomalies (e.g., if the metric were to flat line near its minimum value).

Figure 9B:
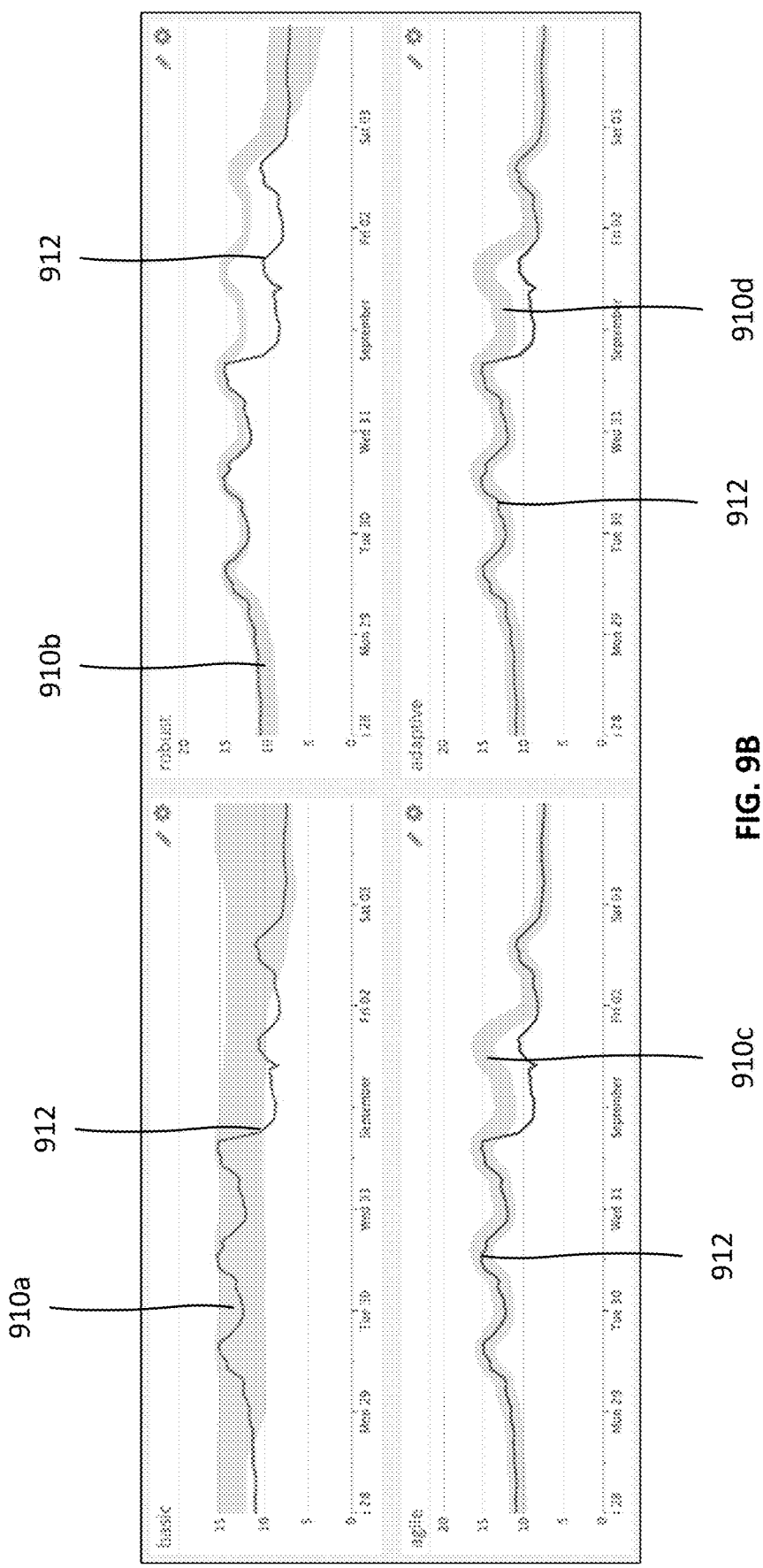

FIG. 9B shows additional example forecast ranges 910a-d generated based on another common performance metric 912. As shown in FIG. 9B, the performance metric 912 exhibits a sudden level shift. Forecast ranges generated using the "agile" and "adaptive" techniques (forecast ranges 910c and 910d, respectively) adjust more quickly to the level shift than the forecast range generated using the "robust" technique (forecast range 910b). Also, the width of the "robust" forecast range 910b increases to reflect greater uncertainty after the level shift, while the width of bounds of the "agile" forecast range 910c and "adaptive" forecast range 910d remains unchanged. In this example, the "standard" forecast range 910a is comparatively a poor fit, where the metric exhibits a strong weekly seasonal pattern.

Figure 9C:
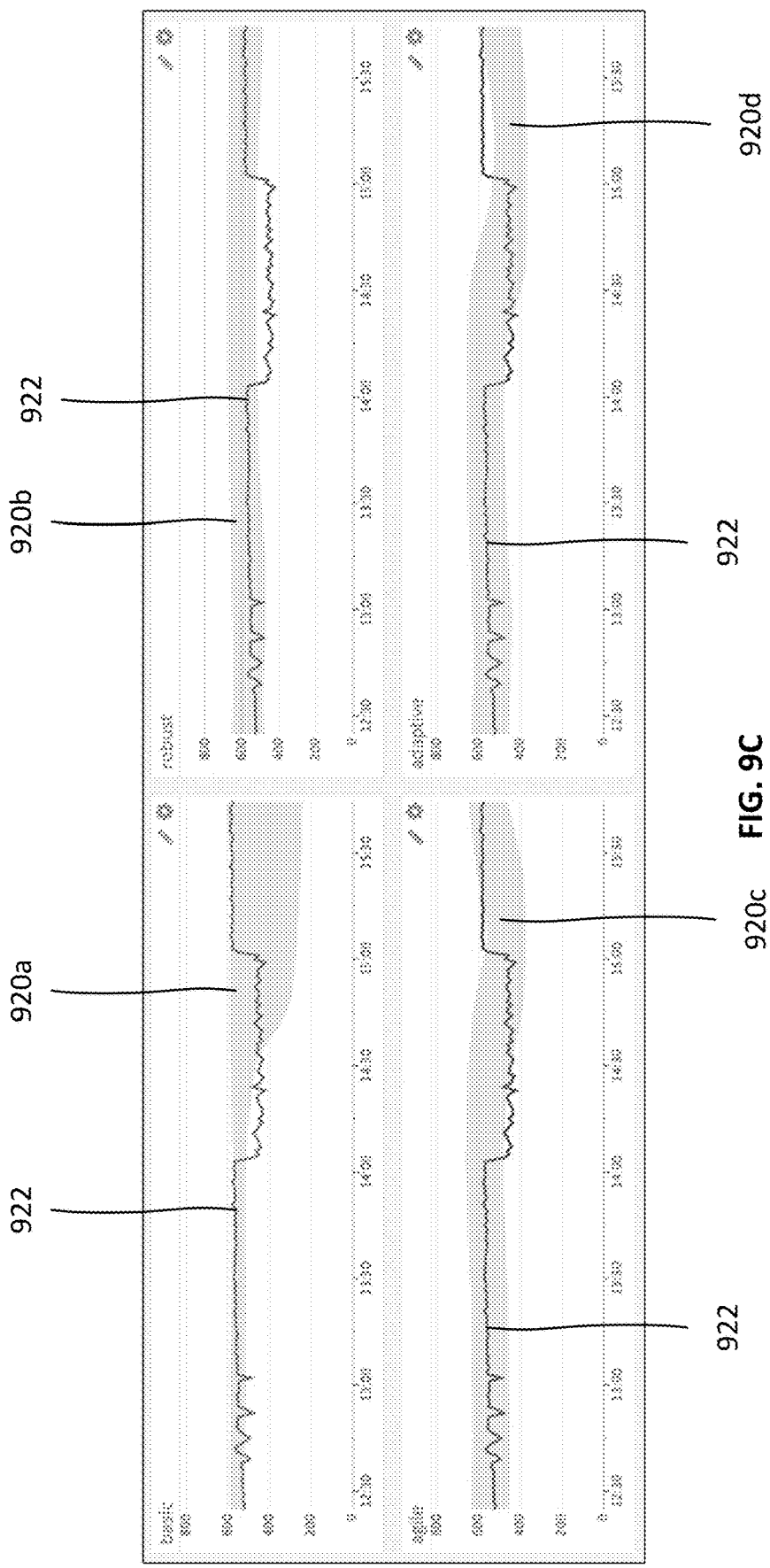

FIG. 9C shows additional example forecast ranges 920a-d generated based on another common performance metric 922. In this example, the performance metric 922 is exhibiting an hour-long anomaly. As shown in FIG. 9C, the "robust" forecast range 920b ignores this anomaly. The "standard" forecast range 920a, the "agile" forecast range 920c, and the "adaptive" forecast range 920d'' all behave as if the anomaly were "normal." For example, the "agile" forecast range 920c and the "adaptive" forecast range 920d even identify the metric's return to its original level as an anomaly.

Figure 9D:
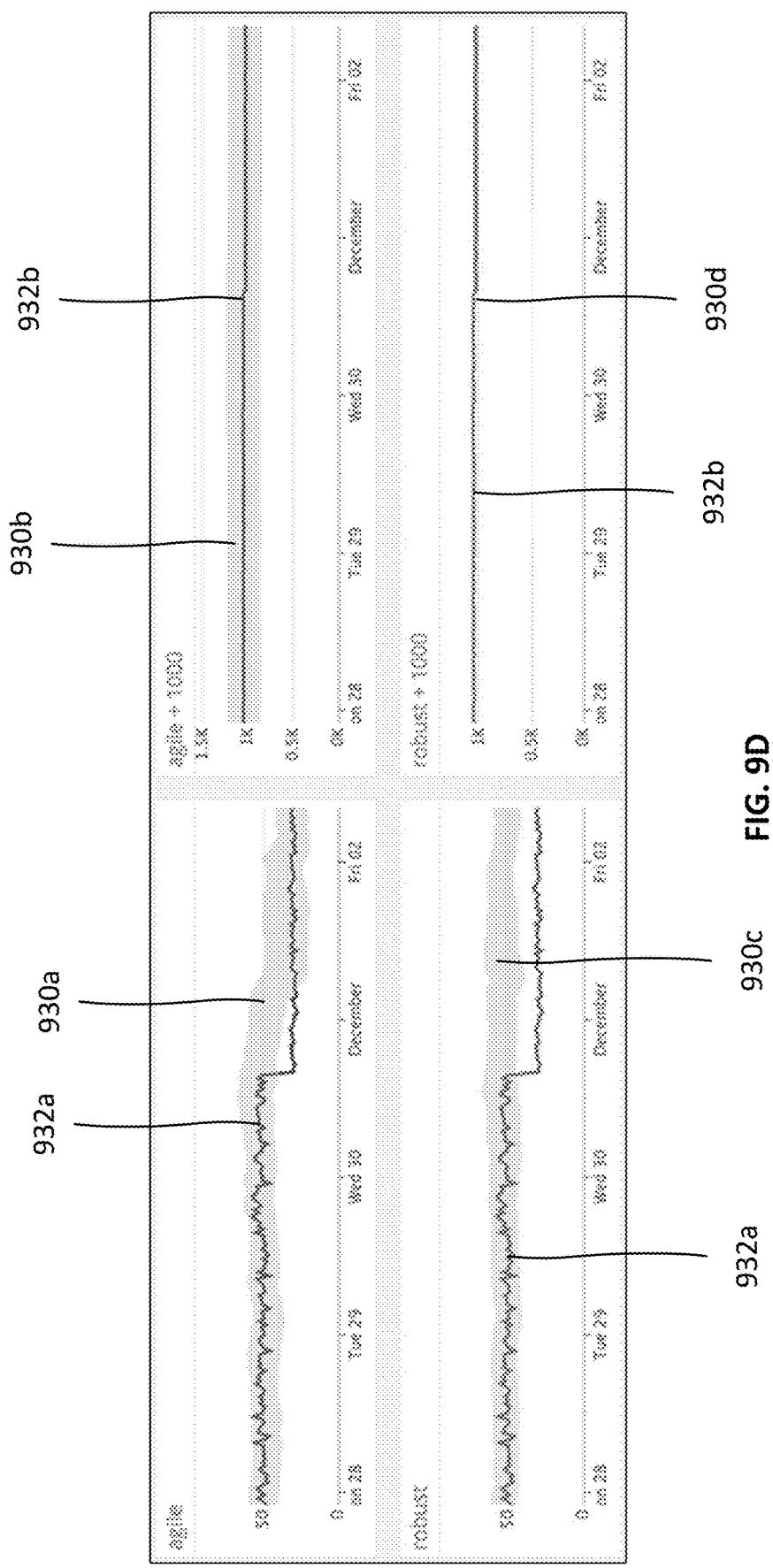

In some cases, the "standard" technique and the "robust" technique are relatively insensitive to scale, while the "agile" technique and the "adaptive" technique comparatively more sensitive to scale. To illustrate, FIG. 9D shows example forecast ranges 930a and 930c generated based on a common performance metric 932a, and forecast ranges 930b and 930d generated based on another common performance metric 932b. The performance metric 932a and 932b differ only with respect to scale (e.g., the performance metric 932b is equal to the performance metric 932a plus 1000). As shown in FIG. 9D, the "agile" technique (e.g., corresponding to forecast ranges 930a and 930b) and the "robust" technique (e.g., corresponding to forecast ranges 930c and 930d) behave differently with respect to a change in scale. For instance, in the graphs on the left-hand side, both the "agile" technique (corresponding to forecast range 930a) and the "robust" technique (corresponding to forecast range 930c) would identify the level-shift as being anomalous. On the right-hand, after 1000 is added to the same metric, the "agile" technique (corresponding to forecast range 930b) no longer calls out the level-shift as being anomalous, whereas "robust" technique (corresponding to forecast range 930d) continues do so.

Figure 9E:
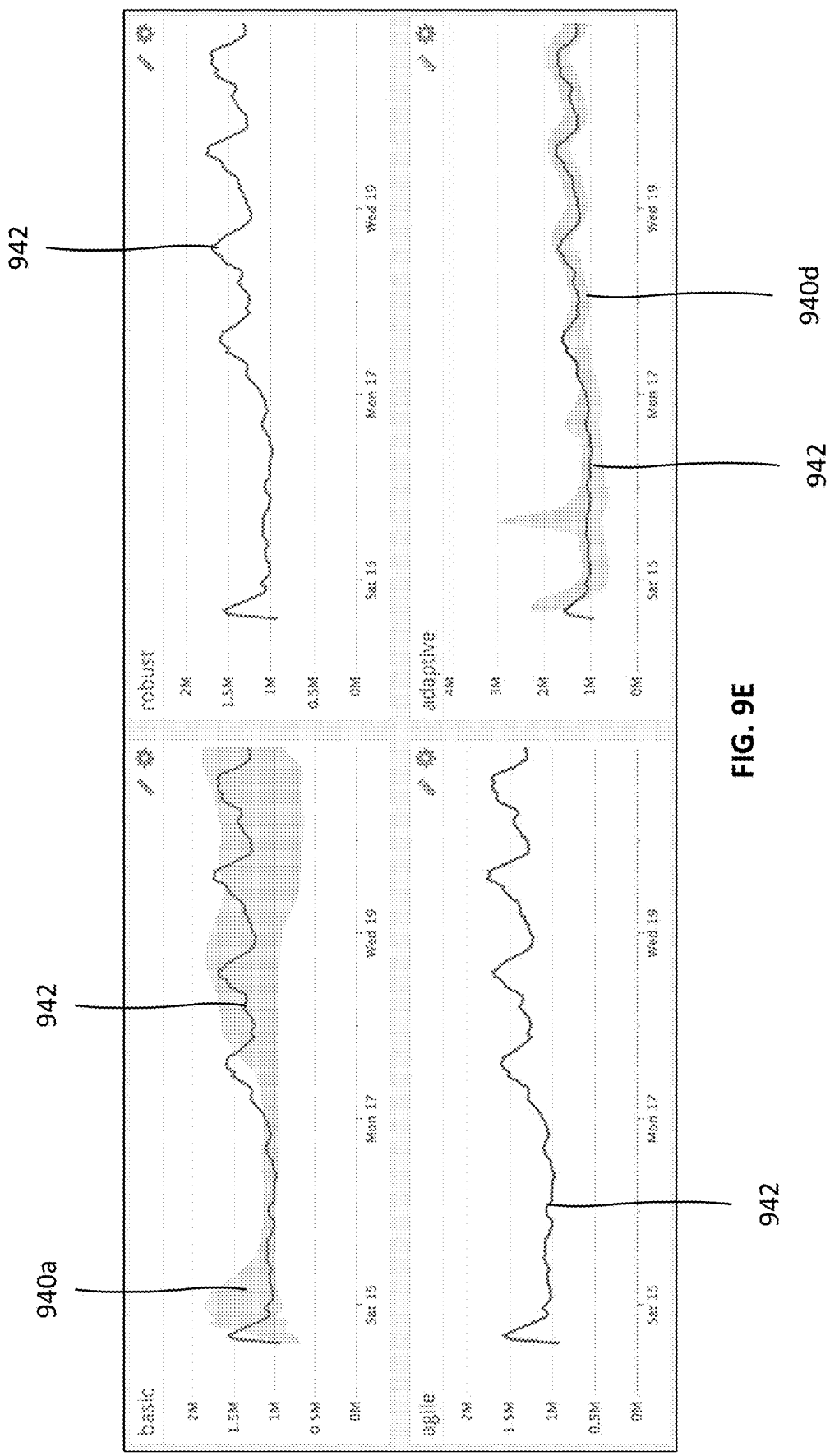

FIG. 9E shows additional example forecast ranges 940a and 940d generated based on another common performance metric 942. FIG. 9E illustrates show each of the technique behaves with respect to a change in the metric being measured. As shown in FIG. 9E, the "robust" technique and the "agile" technique do not show any forecast ranges during the first few weeks. However, the "standard" technique and the "adaptive" techniques start showing forecast ranges 940a and 940d, respectively, shortly after the metric first appears. The "adaptive" technique will leverage the metric's daily seasonal patterns in its predictions, while "standard" technique simply reflects the range of recent values.

As described above, a monitoring system (e.g., a server system having an anomaly detection platform) can obtain historical measurement data regarding a computer system, and use the historical measurement data to identify anomalous conditions associated with that computer system. For example, a monitoring system can obtain a sequence of data items pertaining to a particular computer system, each data item indicating a measured value of a particular performance metric of the computer system at a particular point in time in the past. Based on this information, the monitoring system can identify potentially anomalous conditions that occurred in the past and/or potentially anomalous conditions occurring in the present in connection with the computer system. This can be useful, for example, as it enables a user to identify potential issues that have occurred in connection with the computer system, and take a corrective action to address the issues.

In some cases, a monitoring system can obtain historical measurement data regarding a computer system, and use the historical measurement data to forecast future trends associated with the computer system. For example, a monitoring system can obtain a sequence of data items pertaining to a particular computer system, each data item indicating a measured value of a particular performance metric of the computer system at a particular point in time in the past. Based on this information, the monitoring system can estimate or forecast one or more future values of the performance metric at one or more particular points of time in the future. This can be useful, for example, as it enables a user to anticipate future changes in the performance metric, and identify potential issues before they actually occur. Accordingly, the user can take a proactive action to prevent or mitigate issues before the issues actually arise.

Various techniques can be used to forecast one or more future values of a performance metric. Example techniques include a "linear" technique and a "seasonal" technique.

Further, different techniques can have different properties, and may be particularly suitable in different circumstances. For example, a "seasonal" technique may be particularly suited for forecasting future values of a performance metric that has historically exhibited seasonal variation (e.g., a recurring periodic pattern of variation, such as a recurring daily pattern of variation, weekly pattern of variation, or some other recurring pattern of variation). As another example, a "linear" technique" may be particularly suited for forecasting future values of performance metrics that historically have not exhibited seasonal variation.

In some cases, some or all of the techniques can be agnostic to the type of data being monitored. For example, as described herein, the techniques can be used to forecast future values of one or more performance metrics associated with operations performed on the computer systems. Each of these metrics could pertain to a different property or characteristics and/or indicate one or more values according to different units. Nevertheless, in some cases, some or all of the techniques can be used to forecast these properties, regardless of what property or characteristic is being measured, and regardless of the units of each measurement. This can be beneficial, for example, as it enables the techniques to be used across a wide array of different time-series data sequences, regardless of the specific properties or characteristics that they represent. This further allows the forecast process to be used with and across a wide variety of computing platforms and/or services without needing to be specially configured for such platforms and/or services.

Figure 11:
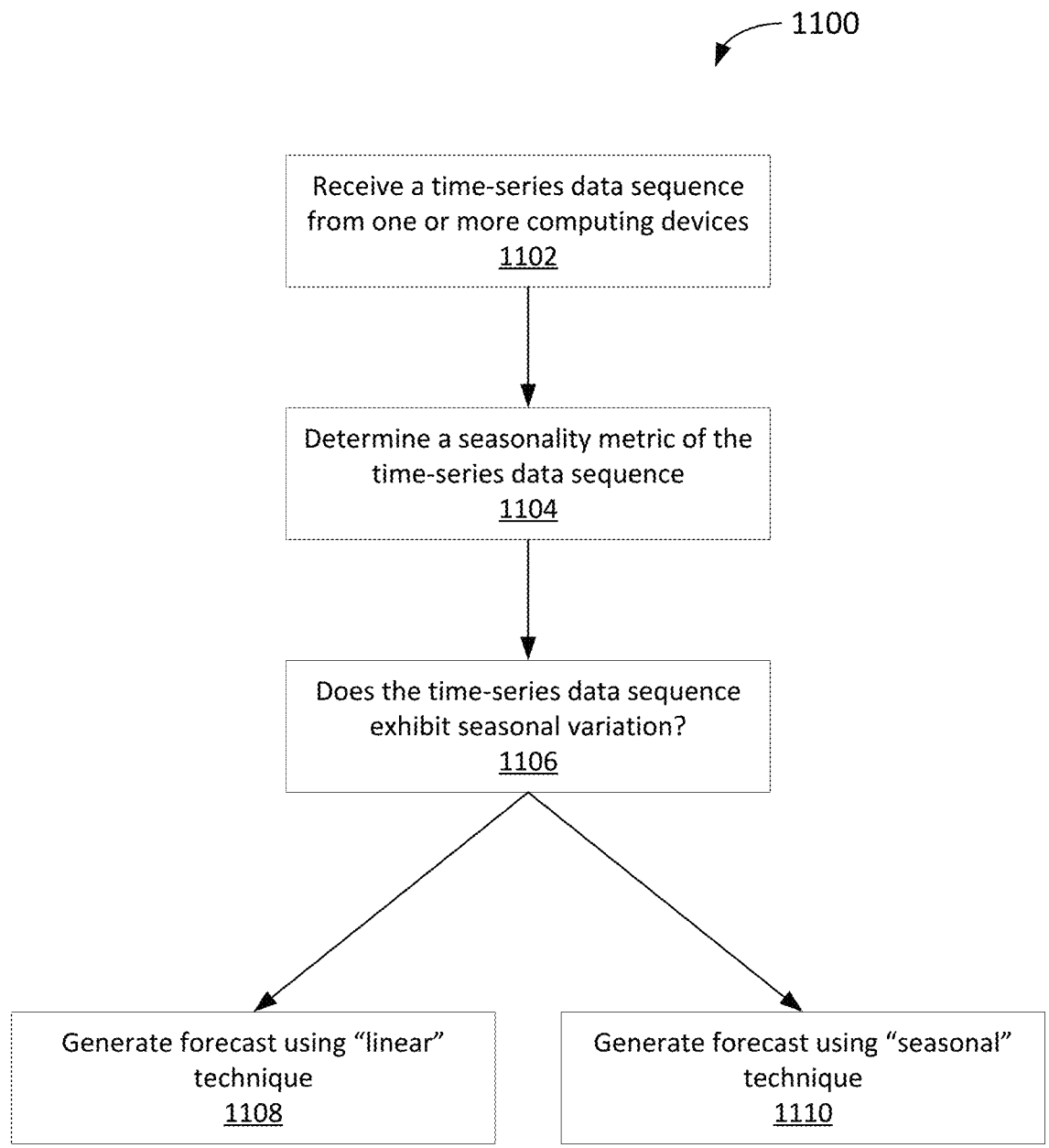
FIG. 11 is a flow chart diagram of an example process for selecting a forecasting technique.

In some cases, a monitoring system can automatically select a forecasting technique based on the properties of the performance metric. An example process 1100 for selecting a forecasting technique is shown in FIG. 11. The process 1100 can be performed, for example, using one or more components of the system 100.

In the process 1100, one or more server devices receive a time-series data sequence from one or more computing devices (step 1102). The time-series data sequence indicates a performance metric associated with operations performed on the one or more computing devices over a period of time. As an example, the server computer system 102 can receive a time-series data sequence from the computer systems 104a and/or 104b describing the performance of the computer systems 104a and/or 104b over the period of time.

In practice, the period of time can vary, depending on the implementation. The period of time can refer, for example, to the period of time spanning between the first and last measurements in the time-series data sequence. For instance, in some cases, the time-series data sequence can include measurements of the performance metric spanning a particular period of time (e.g., one or more seconds, one or more hours, one or more days, one or more months, or any other period of time).

Further, the time-series data sequence can have a particular temporal resolution. The temporal resolution can refer, for example, to the frequency of measurements of the performance metric. In practice, the temporal resolution can vary, depending on the implementation. For example, the time-series can have a temporal resolution of one second (e.g., one measurement every second), one minute (e.g., one measurement every minute), one hour (e.g., one measurement every hour), or any other temporal resolution In some cases, the one or more server devices can obtain a time-series data sequence that is limited to a particular number of data items (e.g., the N most recent data items). This can be useful, for example, in reducing the amount of data to be considered, which may improve the efficiency of generating forecasts (e.g., by reducing computational costs) and/or improve the accuracy of the generated forecasts (e.g., by focusing on more recently obtained measurements over older measurements). In some cases, the one or more server devices can obtain a time-series data sequence having 100 data items, 200 data items, 300 data items, or some other number of data items. In practice, the number can differ, depending on the implementation.

The one or more server devices determine a seasonality metric of the time-series data sequence (step 1104). This can be determined, for example, using the process 500 shown in FIGS. 5A-5B (e.g., by performing steps 502, 504, 506, 508, 510, and 512).

The one or more server devices determine whether the time-series data sequence exhibits seasonal variation (step 1106). For example, the seasonality metric may indicate one or more periodic variations in the time-series data sequence (e.g., recurring daily variation, during weekly variation, or some other recurring variation). Based on this seasonality metric, the one or more server devices can determine that the time-series data sequence exhibits seasonal variation. As another example, the seasonality metric may indicate that the time-series data sequence does not exhibit any periodic variation. Based on this seasonality metric, the one or more server devices can determine that the time-series data sequence does not exhibit seasonal variation.

Upon determining that the time-series data sequence does not exhibit seasonal variation, the one or more server devices generate a forecast using a "linear" technique (step 1108). Alternatively, upon determining that the time-series data sequence exhibits seasonal variation, the one or more server devices generate a forecast using a "seasonal" technique (step 1110). Each of these techniques are described in further detail below.

Figure 12A:
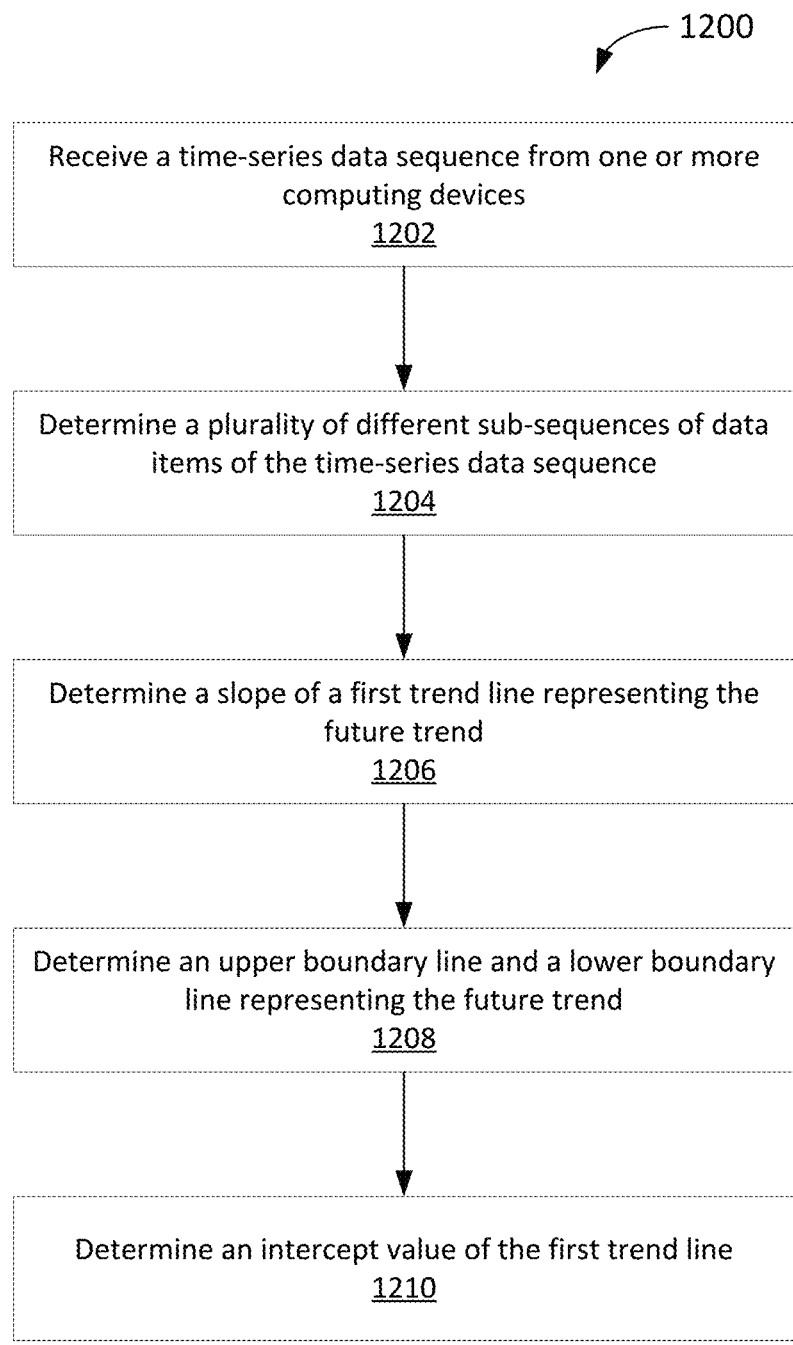
FIG. 12A is a flow chart diagram of an example process for generating a forecast using a "linear" technique.

An example process 1200 for generating a forecast (e.g., forecasting a future trend of a time-series data sequence) using a "linear" technique is shown in FIG. 12A. The process 1200 can be performed, for example, using one or more components of the system 100.

Figure 12B:
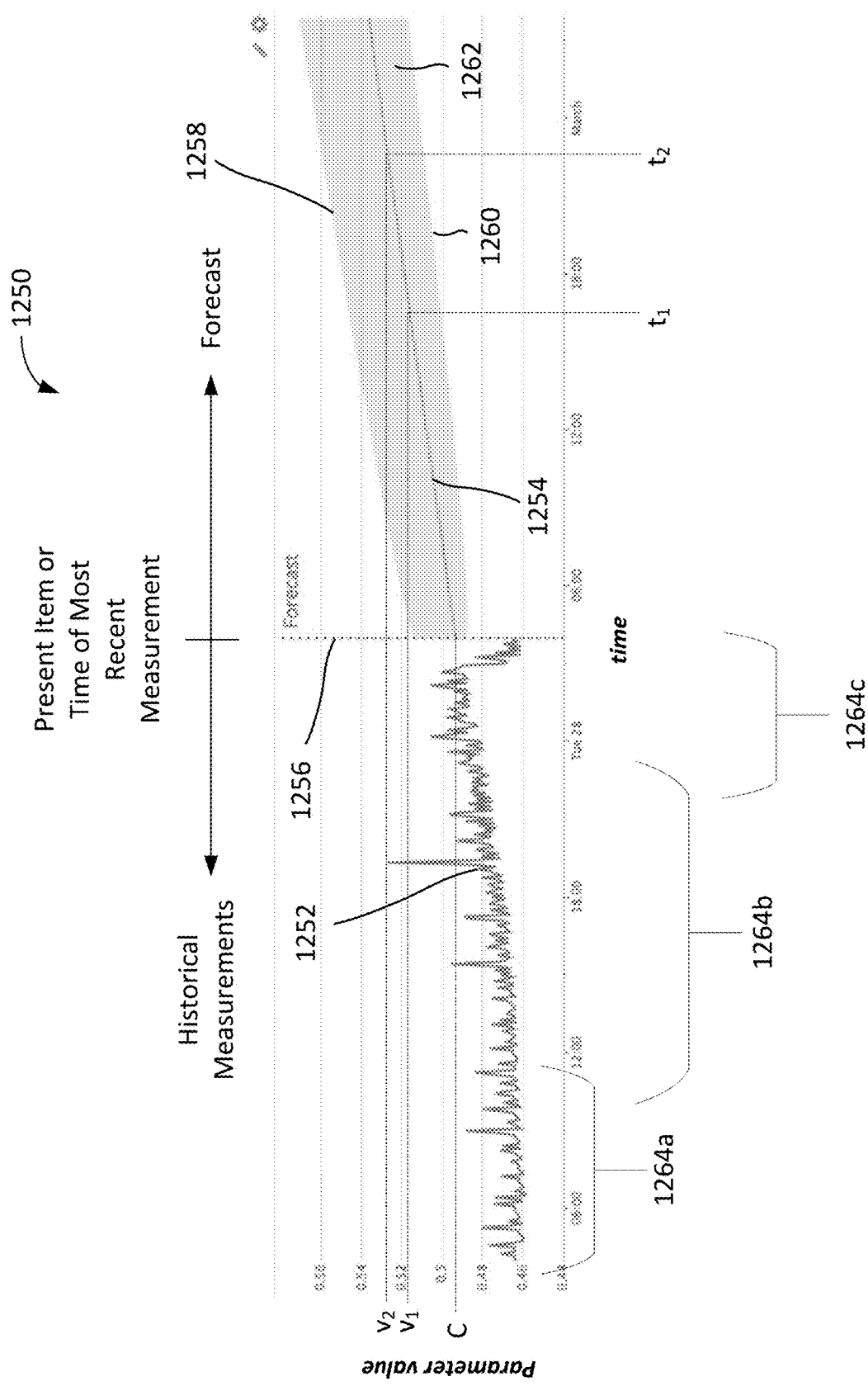
FIG. 12B is a graphical plot depicting an example data sequence, and an example forecasted trend line generated using the "linear" technique.

The process 1200 can be used to generate a trend line representing the predicted future trend of the time-series data sequence (referred to as the "first trend line" in the description of the steps below). FIG. 12B shows a graphical plot 1250 depicting an example data sequence 1252 (solid line), and an example forecasted trend line 1254 (dotted line). The trend line 1254 is a straight line having a particular slope m, and a particular intercept value C. The slope m represents the rate at which the parameter value of the trend line changes with respect to time. For example, in the plot 1250, the slope m is equal to $(v_2-v_1)/(t_2-t_1)$. The intercept C refers to the earliest forecasted value of the trend line. For example, in the plot 1250, the intercept C is equal to the parameter value at the beginning of the trend line 1254 (e.g., the leftmost point of the trend line 1254), or the parameter value at which the trend line 1254 intersects or "intercepts" a vertical line 1256 denoting the time of the last value of the data sequence 1252 (e.g., the "present" time, or the most recent measurement time).

The process 1200 also can be used to generate an upper boundary line and a lower boundary line indicating a range or spread associated with the predicted future trend. As an example, the graphical plot 1250 shown in FIG. 12B includes an upper boundary line 1258 positioned above the trend line 1254 and a lower boundary line 1260 positioned below the trend line 1254, collectively defining a bound region 1262. The vertical width of the bound region 1262 can reflect a "confidence" or estimated "error" of the trend line 1254. For example, a narrower bound region 1262 can indicate that the actual measured parameter value of the performance metric is likely to deviate from the trend line 1254 by a relatively smaller amount. Further, a wider bound region 1262 can indicate that the actual measured parameter value of the performance metric is likely to deviate from the trend line 1254 by a relatively larger amount. In some cases, the upper boundary line 1258 and the lower boundary line 1260 can be bound offsets with respect to the trend line 1254.

In the process 1200, one or more server devices receive a time-series data sequence from one or more computing devices (step 1202). The time-series data sequence indicates a performance metric associated with operations performed on the one or more computing devices over a period of time. Further, the time-series data sequence includes a plurality of data items, each data item corresponding to a respective measurement of the performance metric obtained during the period of time.

In some cases, the time-series data sequence can include a particular number of data items. For example, the time-series data sequence can include the 100 most recent data items, the 200 most recent data items, the 300 most recent data items, or some other number of data items. In practice, the number of data items can vary, depending on the implementation. In some implementations, the number of data item can be a tunable parameter (e.g., determined based on empirical studies).

The one or more server devices determine a plurality of different sub-sequences of data items of the time-series data sequence (step 1204). Each sub-sequence of data items can span a different respective period of time.

In some cases, the one or more server devices can determine a sub-sequence by obtaining a subset of the data items in the time-series data sequence. For example, the one or more server devices can select (i) a beginning data item from the time-series data sequence, and (ii) a ending data item from the time-series data sequence after the beginning data item. The selected data items, and all data items in between, can be obtained as a sub-sequence.

In some cases, the one or more server can obtain multiple sub-sequences in this manner. For example, the one or more server can obtain multiple sub-sequences, where each sub-sequence corresponds to a different beginning data item and/or a different ending data item. In some cases, some or all sub-sequences can differ in length. In some cases, some or all sub-sequences can have the same length. Further, some or all of the sub-sequences can overlap. As an example, FIG. 12B includes brackets 1264*a-c* indicating several example sub-sequences of data item that can be obtained.

In some cases, the one or more server can obtain all possible sub-sequences from the time-series data sequence (e.g., obtain sub-sequences corresponding to every possible combination of beginning data items and ending data items). In some cases, the one or more server can obtain all possible sub-sequences having a particular minimum length (e.g., a minimum of two data items in each sub-sequence, a minimum of three data items in each sub-sequence, or some other minimum number).

The one or more server devices determine a slope of a first trend line representing the future trend (e.g., the slope of the trend line 1254) (step 1206). For example, the one or more server devices can determine, for each sub-sequence of data items, a respective second trend line, where each second trend line has a respective slope. Each second trend line can be a linear regression line fitting the data items in the corresponding sub-sequence of data items. Thus, numerous second trend lines are determined, each representing a linear regression fit of a particular portion of the time-series data sequence.

In some cases, the one or more server devices can determine each of the second trend lines concurrently (e.g., rather than individually calculating each slope in a sequential manner). This can be beneficial, for example, as this enables the one or more server devices to calculate the slope values in a more efficient manner (e.g., in a manner that uses fewer computation resources). Further, this also enables the one or more server devices to calculate the slope values more quickly.

The one or more server devices can further determine a weighted average (e.g., a weighted median) of at least some of the slopes of the second trend lines. This weighted average can be used as the slope of the first trend line.

The slopes can be weighted based on various factors. For example, each of the slopes of the second trend lines can be weighted based on how well each second trend line fits the data items in the corresponding sub-sequence of data items (e.g., using sum of squared errors). If a second trend line is a relatively closer fit, the slope of that second trend line can be weighted more highly. If a second trend line is a relatively poorer fit, the slope of that second trend line can be weighted less highly. Thus, the slopes of better fitting second trend lines are more heavily favored.

As another example, each of the slopes of the second trend lines can be weighted based on how far in the past the sub-sequence ends. If a sub-sequence ends relatively more recently (e.g., the last data item in the sub-sequence is relatively recent), the slope of the second trend line for that sub-sequence can be weighted more highly. If a sub-sequence ends relatively less recently (e.g., the last data item in the sub-sequence is relatively less recent), the slope of the second trend line for that sub-sequence can be weighted less highly. Thus, the slopes of trend lines fitting "fresher" or more recent measurements are more heavily favored.

As another example, each of the slopes of the second trend lines can be weighted based the lengths of the sub-sequences. If a sub-sequence is relatively longer (e.g., containing more data items), the slope of the second trend line for that sub-sequence can be weighted more highly. If a sub-sequence is relatively shorter (e.g., containing fewer data items), the slope of the second trend line for that sub-sequence can be weighted less highly. Thus, the slopes of trend lines fitting longer sequences of measurements are more heavily favored.

The one or more server devices can also determine an upper boundary line and a lower boundary line representing the future trend (e.g., the upper boundary line 1258 and the lower boundary line 1260) (step 1208). For example, the one or more server devices can determine, for each second trend line, a respective regression error with respect to the corresponding sub-sequence of data items. In some cases, the upper boundary line and the lower boundary line can be offsets with respect to the first trend line by a particular amount.

In some cases, the upper boundary line and the lower boundary line can be determined based on the regression errors of the slopes of the second trend lines. For example, if the regression errors are relatively large, the upper boundary line and the lower boundary line can be further apart (creating a wider bound region 1262). As another example, if the regression errors are relatively small, the upper boundary line and the lower boundary line can be closer together (creating a narrower bound region 1262). In some cases, the difference between the upper boundary line and the lower boundary line can increase over time according to a square-root factor that models the stochastic behavior of the time-series data sequence.

In some cases, sub-sequences that are shorter than a particular threshold length (e.g., having less than N number of data items) can be disregarded for the computation of the slope of the first trend line. But, the regression errors on those short sub-sequences can be used in determining the upper and lower boundary lines. That is, variations that are longer than a particular length of time are relevant behavior to be modeled and are taken into account in the forecast slope calculation (as well as in the forecast bounds calculation), whereas shorter variations are noise to be used to calculate the width of the forecast bounds. In some implementations, the threshold length can be a tunable parameter (e.g., determined based on empirical studies).

The one or more server devices can also determine an intercept value of the first trend line (e.g., the intercept C of the trend line 1254) (step 1210). For example, the one or more server devices can determine, for each sub-sequence of data items, a respective third first trend line. Each third trend line can be a linear regression line fitting the data items in the corresponding sub-sequence of data items. Further, each third trend line can have a slope equal to the slope of the first trend line. Further, each third trend line can have a respective intercept value. The one or more server devices can determine a weighted average of at least some of the intercept values of the third trend lines. This weighted average can be used as the intercept value of the first trend line.

For instance, the one or more server devices can re-calculate linear regression trend lines for each of the sub-sequences, but with an "enforced" or specified slope (e.g., the previously calculated slope for the first trend line). Further, the resulting intercepts of each of these linear regression trend lines can be weighted based on the regression fitness of the trend lines, a recentness of the data items of the sub-sequences, and the length of the sub-sequences (e.g., in a simmer manner as discussed above with respect to the weighting of slopes). The intercept of the first trend line can be selected by determining the weighted average (e.g., median) of the intercepts of in accordance with these weights.

Figure 13A:
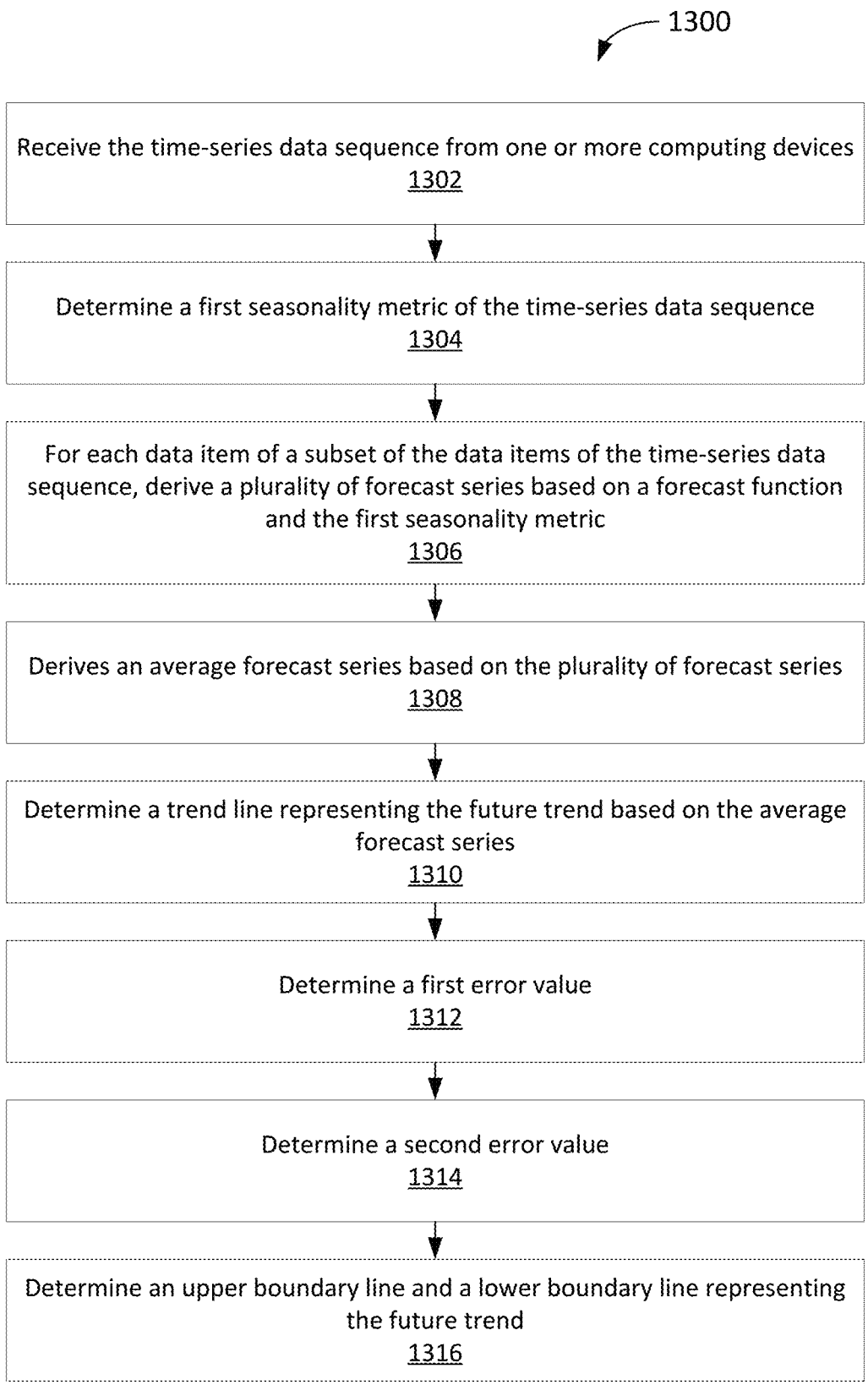
FIG. 13A is a flow chart diagram of an example process for generating a forecast using a "seasonal" technique.

An example process 1300 for generating a forecast (e.g., forecasting a future trend of a time-series data sequence) using a "seasonal" technique is shown in FIG. 13A. The process 1300 can be performed, for example, using one or more components of the system 100. Aspects of the process 1300 can be similar to the "agile" technique for detecting anomalies (e.g., as described with respect to FIGS. 7A and 7B).

The process 1300 can be used to generate a trend line representing the predicted future trend of the time-series data sequence. This trend line need not be a straight line. For example, the process 1300 can be used to generate a trend line that varies in a manner accounting for the seasonality of the time-series data sequence.

Figure 13B:
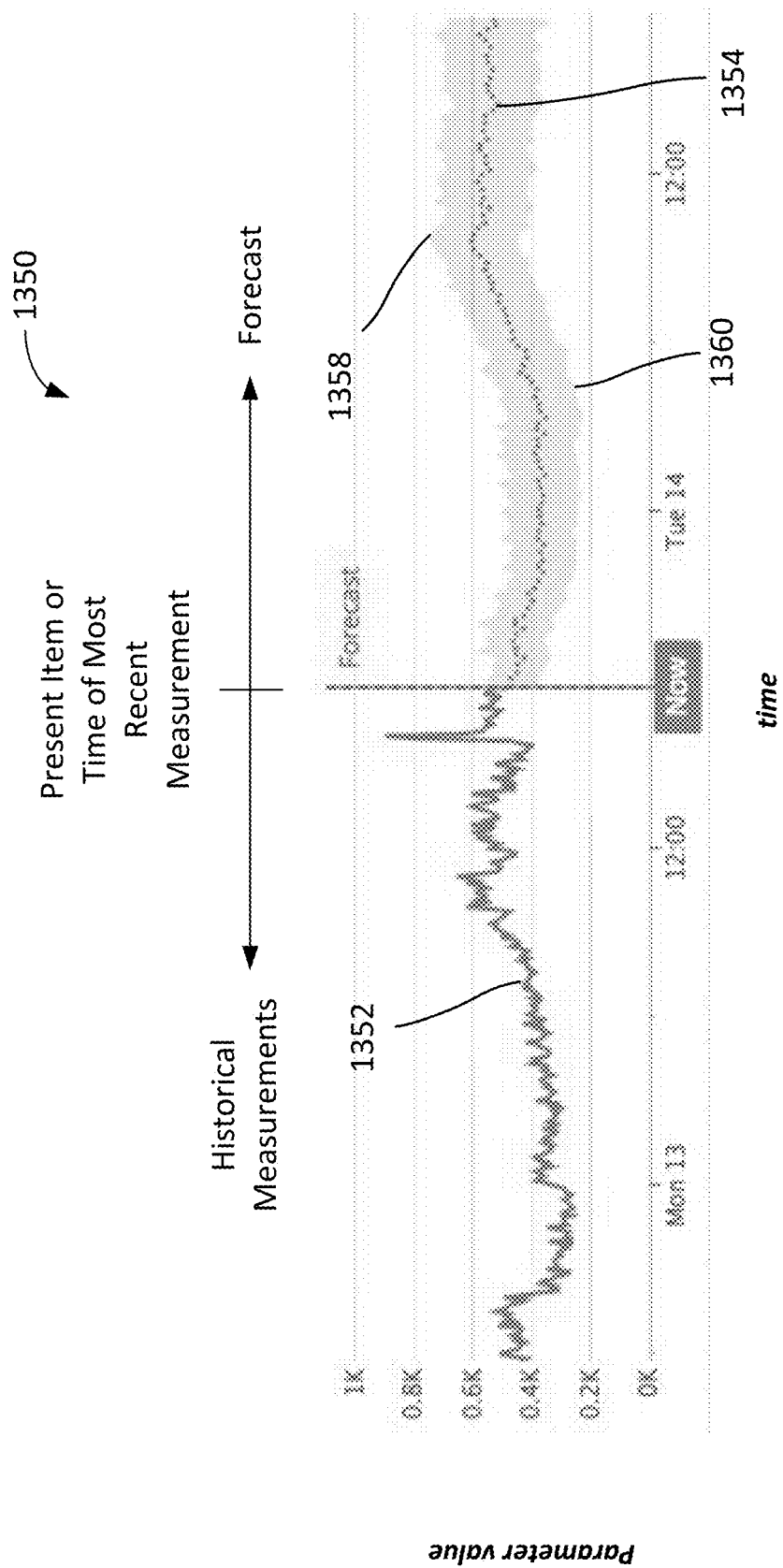
FIG. 13B is a graphical plot depicting an example data sequence, and an example forecasted trend line generated using the "seasonal" technique.

FIG. 13B shows a graphical plot 1350 depicting an example data sequence 1352 (solid line), and an example forecasted trend line 1354 (dotted line). The trend line 1354 is not straight, and includes variations that account for the seasonality of the time-series data sequence 1352.

The process 1300 also can be used to generate an upper boundary line and a lower boundary line indicating a range or spread associated with the predicted future trend. As an example, the graphical plot 1350 shown in FIG. 13B includes an upper boundary line 1356 positioned above the trend line 1354 and a lower boundary line 1358 positioned below the trend line 1354, collectively defining a bound region 1360. The vertical width of the bound region 1360 can reflect a "confidence" or estimated "error" of the trend line 1354. For example, a narrower bound region 1360 can indicate that the actual measured parameter value of the performance metric is likely to deviate from the trend line 1354 by a relatively smaller amount. Further, a wider bound region 1360 can indicate that the actual measured parameter value of the performance metric is likely to deviate from the trend line 1354 by a relatively larger amount. In some cases, the upper boundary line 1358 and the lower boundary line 1360 can be bound offsets with respect to the trend line 1354.

In the process 1300, one or more server devices receive the time-series data sequence from one or more computing devices (step 1302). The time-series data sequence indicates a performance metric associated with operations performed on the one or more computing devices over a period of time. Each data item corresponding to a respective measurement of the performance metric obtained during the period of time. This can be performed in a similar manner as step 702 (as described with respect to FIG. 7A).

Further, the one or more server devices determines a first seasonality metric of the time-series data sequence (step 1304). The first seasonality metric corresponds to a first periodic time interval for which the time-series data exhibits recurring variation. This can be performed in a similar manner as step 704 (as described with respect to FIG. 7A).

For each data item of a subset of the data items of the time-series data sequence, the one or more server devices derives a plurality of forecast series based on a forecast function and the first seasonality metric (step 1306), and derives an average forecast series based on the plurality of forecast series (step 1308). These steps can be performed in a similar manner as steps 706 and 708, respectively (as described with respect to FIG. 7A).

The one or more server devices determine a trend line representing the future trend based on the average forecast series (step 1310). This can be performed by sequentially determining one or more additional data items representing the future trend using the average forecast series as a predictive function. For example, using the average forecast series as a predictive function, the one or more server devices can determine a single data item representing the predicted future value of the performance metric that is "one step ahead" of the historical measurements (e.g., the predicted value of the next measurement in the time-series data sequence). The one or more serve devices can incorporate that predicted value into the time-series data sequence, and using the lengthened time-series data sequence, determine another data item representing the next predicted future value of the performance metric (e.g., using the average forecast series as a predictive function). The one or more server devices can repeat this process multiple times to progressively obtain a sequence of several data items representing the predicted future values of the performance metric. These data items can be used as the predicted trend line.

The one or more server devices determine a first error value (step 1312). The first error value corresponds to a deviation between (i) a second average forecast series determined based on a first portion of the time-series data sequence, and (ii) a second portion of the time-series data sequence following the first portion. For example, the one or more server devices can obtain a sequence of known historical measurements (e.g., some or all of the time-series data sequence). The one or more server devices can determine a forecast based on a beginning portion of the sequence, and compare the forecast to the end portion of the sequence (e.g., to "test" the accuracy of the forecast technique based on historical data). Thus, the one or more server devices can estimate an error associated with using the "seasonal" forecast technique to predict future values of the time-series data sequence. The first error value can be referred to as a "calibration error."

The one or more server devices also determine a second error value (step 1314). The second error value corresponds to a noise property of the time-series data sequence (e.g., the noise inherent in the time-series data sequence). The second error value can be referred to as an "oscillation error."

The one or more service devices determine an upper boundary line and a lower boundary line representing the future trend (step 1316). The upper boundary line and the lower boundary line are determined based on a weighted sum of the first error value and the second error value. In some cases, the weighted sum can also be scaled by a tuning parameter (e.g., a square root factor) to take into account a compounding of the error over time.

Some implementations of subject matter and operations described in this specification can be implemented in digital electronic circuitry, or in computer software, firmware, or hardware, including the structures disclosed in this specification and their structural equivalents, or in combinations of one or more of them. For example, in some implementations, the server systems 102, the computer systems 104a and 104b, the platform 150, and the client computer systems 108a-c can be implemented using digital electronic circuitry, or in computer software, firmware, or hardware, or in combinations of one or more of them. In another example, the processes 500, 600, 700, 800, 1200, and 1300 can be implemented using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Figure 10:
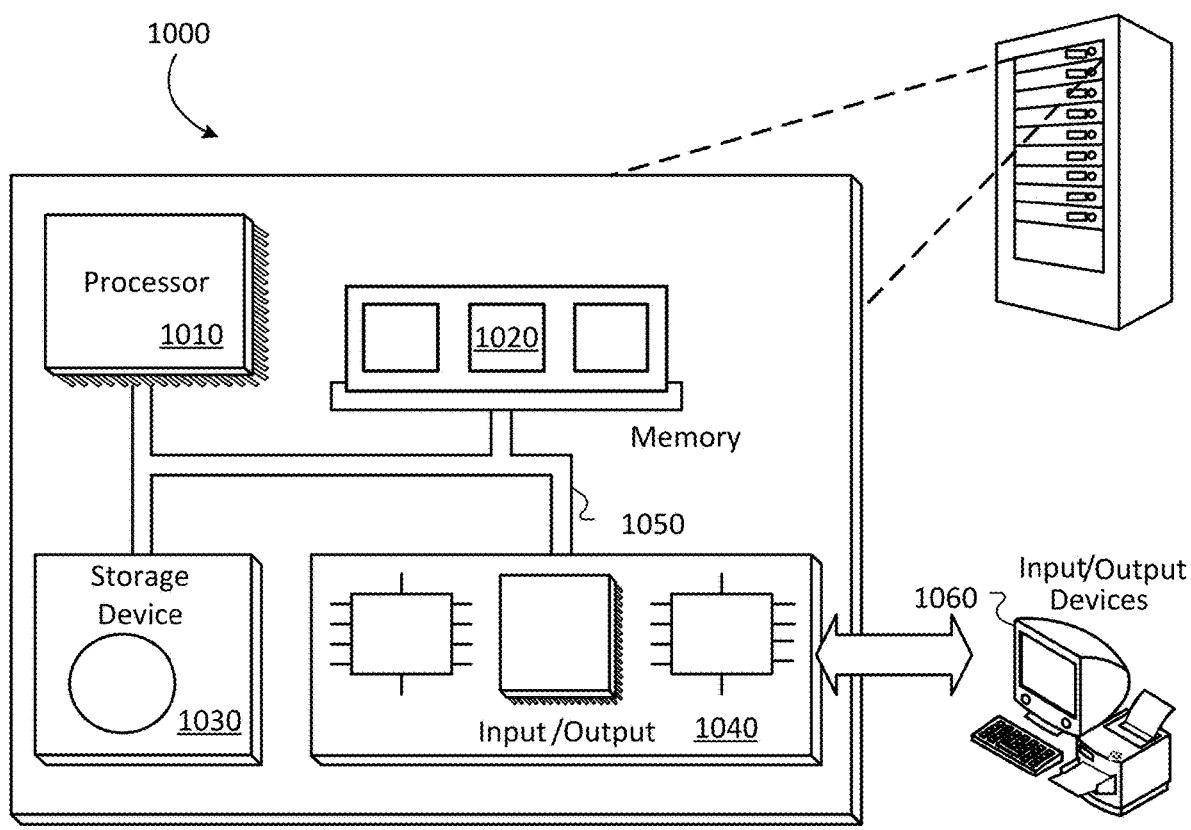
FIG. 10 is a diagram of an example computer system.

FIG. 10 shows an example computer system 1000 that includes a processor 1010, a memory 1020, a storage device 1030 and an input/output device 1040. Each of the components 1010, 1020, 1030 and 1040 can be interconnected, for example, by a system bus 1050. The processor 1010 is capable of processing instructions for execution within the system 1000. In some implementations, the processor 1010 is a single-threaded processor, a multi-threaded processor, or another type of processor. The processor 1010 is capable of processing instructions stored in the memory 1020 or on the storage device 1030. The memory 1020 and the storage device 1030 can store information within the system 1000.

The input/output device 1040 provides input/output operations for the system 1000. In some implementations, the input/output device 1040 can include one or more of a network interface device, e.g., an Ethernet card, a serial communication device, e.g., an RS-232 port, and/or a wireless interface device, e.g., an 802.11 card, a 3G wireless modem, a 4G wireless modem, a 5G wireless modem, etc. In some implementations, the input/output device can include driver devices configured to receive input data and send output data to other input/output devices, e.g., keyboard, printer and display devices 1060. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, it will be understood that various modifications may be made without departing from the spirit and scope of the invention. Accordingly, other embodiments are within the scope of the following claims.

What is claimed is:

1. A method of detecting a seasonal variation within a first time-series data sequence, the method comprising:
   receiving, at one or more server devices, the first time-series data sequence from one or more computing devices, the first time-series data sequence indicating a performance metric associated with operations performed on the one or more computing devices over a first period of time, the first time-series data sequence comprising a first temporal resolution;
   deriving, by at least one processor of the one or more server devices, a plurality of second time-series data sequences from the first time-series data sequence, wherein each second time-series data sequence comprises a respective second temporal resolution that is less than the first temporal resolution, and wherein each second time-series data sequence indicates the performance metric over a respective second period of time less than the first period of time;
   for each second time-series data sequence,
   (1) removing a respective trend component of the second time-series data sequence to obtain a de-trended second time-series data sequence, and
   (2) autocorrelating the de-trended second time-series data sequence to obtain a plurality of autocorrelation coefficients, wherein each autocorrelation coefficient corresponds to a different respective autocorrelation time lag;
   for each set of de-trended second time-series data sequences having a common second temporal resolution, determining at least one extremum associated with the autocorrelation coefficients of the second time-series data sequences of the set;
   determining one or more seasonality metrics of the first time-series data sequence based on the at least one extremum, each seasonality metric corresponding to a respective periodic time interval for which the first time-series data exhibits recurring variation;
   identifying, based on one or more seasonality metrics, at least one anomaly related to the operations being performed on the one or more computing devices over the first period of time; and
   responsive to identifying the at least one anomaly, causing one or more additional computing devices to be activated to alleviate a processing load on the one or more computing devices.

2. The method of claim 1, wherein a beginning of the first period of time corresponds to a time of a first measurement of the performance metric in the first time-series data sequence, and wherein an end of the first period of time corresponds to a time of a last measurement of the performance metric in the first time-series data sequence.

3. The method of claim 1, wherein the first temporal resolution corresponds to a frequency of measurement of the performance metric in the first time-series data sequence.

4. The method of claim 1, wherein the performance metric is at least one of a number of requests received by the one or more computing devices during the first period of time, an amount of computational resources consumed by the one or more computing devices during the first period of time, an amount of data written by the one or more computing devices during the first period of time, an amount of data transmitted or received by the one or more computing devices during the first period of time, an amount of time that the one or more computing devices takes to fulfill one or more requests during the first period of time, or a number of users that accessed a service provided by the one or more computing devices during the first period of time.

5. The method of claim 1, wherein removing the respective trend component of the second time-series data sequence comprises calculating a centered rolling median of the second time-series data sequence.

6. The method of claim 1, wherein autocorrelating the de-trended second time-series data sequence comprises performing an autocorrelation using Kendall's tau correlation coefficient.

7. The method of claim 1, wherein determining at least one extremum associated with the autocorrelation coefficients of the second time-series data sequences of the set comprises identifying a particular autocorrelation coefficient that is larger than each of the other autocorrelation coefficients within a radius r of the time lag of the particular autocorrelation coefficient.

8. The method of claim 1, wherein each of the one or more seasonality metrics corresponds to a respective periodic time interval for which the first time-series data exhibits recurring variation.

9. The method of claim 1, wherein each of the one or more seasonality metrics corresponds to all of the lag times having autocorrelation coefficients that exceed a threshold value.

10. The method of claim 1, further comprising:
responsive to identifying the at least one anomaly, generating, for the at least one anomaly, a notification that the at least one anomaly has occurred.

11. The method of claim 1, wherein at least one of the one or more seasonality metrics of the first time-series data sequence represents that the processing load for the one or more computing devices is higher than an expected processing load for the respective periodic time interval for which the first time-series data exhibits recurring variation; and
wherein the at least one anomaly indicates that the processing load is higher than the expected processing load for the one or more computing devices.

12. A system comprising:
one or more processors; and
a non-transitory computer-readable medium including one or more sequences of instructions which, when executed by the one or more processors, causes:
receiving, at the system, a first time-series data sequence from one or more computing devices, the first time-series data sequence indicating a performance metric associated with operations performed on the one or more computing devices over a first period of time, the first time-series data sequence comprising a first temporal resolution;
deriving, by at least one processor of the system, a plurality of second time-series data sequences from the first time-series data sequence, wherein each second time-series data sequence comprises a respective second temporal resolution that is less than the first temporal resolution, and wherein each second time-series data sequence indicates the performance metric over a respective second period of time less than the first period of time;

for each second time-series data sequence,
(1) removing a respective trend component of the second time-series data sequence to obtain a de-trended second time-series data sequence, and
(2) autocorrelating the de-trended second time-series data sequence to obtain a plurality of autocorrelation coefficients, wherein each autocorrelation coefficient corresponds to a different respective autocorrelation time lag;
for each set of de-trended second time-series data sequences having a common second temporal resolution, determining at least one extremum associated with the autocorrelation coefficients of the second time-series data sequences of the set;
determining one or more seasonality metrics of the first time-series data sequence based on the at least one extremum, each seasonality metric corresponding to a respective periodic time interval for which the first time-series data exhibits recurring variation;
identifying, based on one or more seasonality metrics, at least one anomaly related to the operations being performed on the one or more computing devices over the first period of time; and
responsive to identifying the at least one anomaly, causing one or more additional computing devices to be activated to alleviate a processing load on the one or more computing devices.

13. The system of claim 12, wherein a beginning of the first period of time corresponds to a time of a first measurement of the performance metric in the first time-series data sequence, and wherein an end of the first period of time corresponds to a time of a last measurement of the performance metric in the first time-series data sequence.

14. The system of claim 12, wherein the first temporal resolution corresponds to a frequency of measurement of the performance metric in the first time-series data sequence.

15. The system of claim 12, wherein the performance metric is at least one of a number of requests received by the one or more computing devices during the first period of time, an amount of computational resources consumed by the one or more computing devices during the first period of time, an amount of data written by the one or more computing devices during the first period of time, an amount of data transmitted or received by the one or more computing devices during the first period of time, an amount of time that the one or more computing devices takes to fulfill one or more requests during the first period of time, or a number of users that accessed a service provided by the one or more computing devices during the first period of time.

16. The system of claim 12, wherein removing the respective trend component of the second time-series data sequence comprises calculating a centered rolling median of the second time-series data sequence.

17. The system of claim 12, wherein autocorrelating the de-trended second time-series data sequence comprises performing an autocorrelation using Kendall's tau correlation coefficient.

18. The system of claim 12, wherein determining at least one extremum associated with the autocorrelation coefficients of the second time-series data sequences of the set comprises identifying a particular autocorrelation coefficient that is larger than each of the other autocorrelation coefficients within a radius r of the time lag of the particular autocorrelation coefficient.

19. The system of claim 12, wherein each of the one or more seasonality metrics corresponds to a respective periodic time interval for which the first time-series data exhibits recurring variation.

20. The system of claim 12, wherein each of the one or more seasonality metrics corresponds to all of the lag times having autocorrelation coefficients that exceed a threshold value.

21. A non-transitory computer-readable medium including one or more sequences of instructions which, when executed by one or more processors, causes:

receiving, at one or more server devices, a first time-series data sequence from one or more computing devices, the first time-series data sequence indicating a performance metric associated with operations performed on the one or more computing devices over a first period of time, the first time-series data sequence comprising a first temporal resolution;

deriving, by at least one processor of the one or more server devices, a plurality of second time-series data sequences from the first time-series data sequence, wherein each second time-series data sequence comprises a respective second temporal resolution that is less than the first temporal resolution, and wherein each second time-series data sequence indicates the performance metric over a respective second period of time less than the first period of time;

for each second time-series data sequence,
(1) removing a respective trend component of the second time-series data sequence to obtain a de-trended second time-series data sequence, and
(2) autocorrelating the de-trended second time-series data sequence to obtain a plurality of autocorrelation coefficients, wherein each autocorrelation coefficient corresponds to a different respective autocorrelation time lag;

for each set of de-trended second time-series data sequences having a common second temporal resolution, determining at least one extremum associated with the autocorrelation coefficients of the second time-series data sequences of the set;

determining one or more seasonality metrics of the first time-series data sequence based on the at least one extremum, each seasonality metric corresponding to a respective periodic time interval for which the first time-series data exhibits recurring variation;

identifying, based on one or more seasonality metrics, at least one anomaly related to the operations being performed on the one or more computing devices over the first period of time; and responsive to identifying the at least one anomaly, causing one or more additional computing devices to be activated to alleviate a processing load on the one or more computing devices.

22. The non-transitory computer-readable medium of claim 21, wherein the performance metric is at least one of a number of requests received by the one or more computing devices during the first period of time, an amount of computational resources consumed by the one or more computing devices during the first period of time, an amount of data written by the one or more computing devices during the first period of time, an amount of data transmitted or received by the one or more computing devices during the first period of time, an amount of time that the one or more computing devices takes to fulfill one or more requests during the first period of time, or a number of users that accessed a service provided by the one or more computing devices during the first period of time.

* * * * *